(12) United States Patent
Obana et al.

(10) Patent No.: US 6,706,919 B1
(45) Date of Patent: Mar. 16, 2004

(54) CATALYST FOR USE IN PRODUCING ACETIC ACID, PROCESS FOR PRODUCING THE CATALYST, AND PROCESS FOR PRODUCING ACETIC ACID USING THE CATALYST

(75) Inventors: Yoshiaki Obana, Oita (JP); Kenichi Abe, Oita (JP); Wataru Oguchi, Oita (JP); Kenji Yamada, Oita (JP); Hiroshi Uchida, Oita (JP)

(73) Assignee: Showa Denko K. K., Tokyo (JP)

( * ) Notice: Subject to any disclaimer, the term of this patent is extended or adjusted under 35 U.S.C. 154(b) by 140 days.

(21) Appl. No.: 09/674,920
(22) PCT Filed: Oct. 4, 2000
(86) PCT No.: PCT/JP00/06923
§ 371 (c)(1), (2), (4) Date: Nov. 8, 2000
(87) PCT Pub. No.: WO01/24924
PCT Pub. Date: Apr. 12, 2001

Related U.S. Application Data
(60) Provisional application No. 60/164,153, filed on Nov. 8, 1999.

(30) Foreign Application Priority Data

Oct. 5, 1999 (JP) .......................................... 11/284522
May 23, 2000 (JP) ....................................... 2000/151130

(51) Int. Cl.$^7$ .......................... C07C 229/00; B01J 21/08
(52) U.S. Cl. ....................................... 562/548; 502/262
(58) Field of Search ........................... 562/548; 502/262

(56) References Cited

U.S. PATENT DOCUMENTS 5,405,996 A * 4/1995 Suzuki et al.

FOREIGN PATENT DOCUMENTS

| GB | 1025679 A | 4/1966 | |
|---|---|---|---|
| JP | 6-293695 A | 10/1994 | ............ C07C/53/08 |
| JP | 9-67298 A | 3/1997 | .......... C07C/51/245 |
| JP | 10-17523 A | 1/1998 | ............ C07C/53/08 |
| WO | WO 94/22803 | 10/1994 | ............ C07C/53/08 |
| WO | WO 98/47850 A | 10/1998 | |

* cited by examiner

*Primary Examiner*—Johann Richter
*Assistant Examiner*—Paul A. Zucker
(74) *Attorney, Agent, or Firm*—Sughrue Mion, PLLC

(57) ABSTRACT

A catalyst for use in producing acetic acid, comprising as essential components (a) palladium and (b) at least one compound selected from heteropolyacids and/or salts thereof, wherein (c) a vanadium element and/or molybdenum element is contained in a specific proportion. Acetic acid is produced from ethylene and oxygen by a gas phase single-stage reaction using the catalyst.

19 Claims, 2 Drawing Sheets

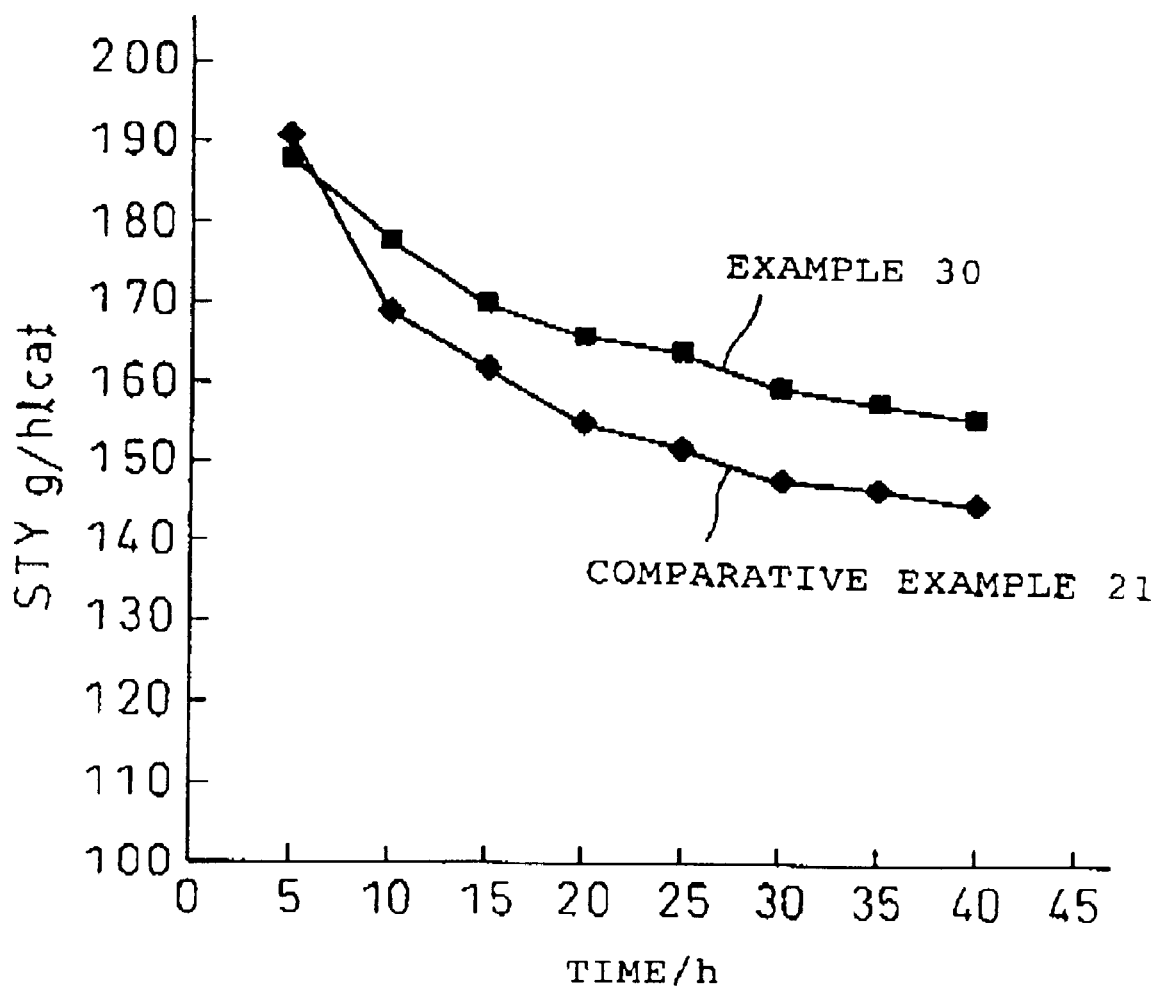

CATALYST FOR USE IN PRODUCING ACETIC ACID, PROCESS FOR PRODUCING THE CATALYST, AND PROCESS FOR PRODUCING ACETIC ACID USING THE CATALYST

CROSS-REFERENCE TO RELATED APPLICATIONS

This application is a 371 of PCT/JP00/06923, filed Oct. 4, 2000, which claims benefit of Ser. No. 60/164,153, filed Nov. 8, 1999.

TECHNICAL FIELD

The present invention relates to a catalyst for use in producing acetic acid, a process for producing the catalyst and a process for producing acetic acid using the catalyst, which are used in the production of acetic acid from ethylene and oxygen by a single-stage catalytic reaction.

BACKGROUND ART

For producing acetic acid, a method of oxidizing acetaldehyde, a method of reacting methanol and carbon monoxide and a method of oxidizing liquid paraffin are conventionally used in practice.

The method for producing acetic acid from ethylene through single stage is advantageous in many points in view of the industrial production process and profitability and a large number of techniques have been proposed thereon. Examples thereof include a liquid phase single-stage oxidation process using an oxidation-reduction catalyst of metal ion pair such as palladium and cobalt and/or iron (see, French Patent No. 1,448,361), and a gas phase single-stage oxidation process using a catalyst comprising palladium-phosphoric acid or sulfur-containing modifying agent (see, Japanese Unexamined Patent Publications No. 47-13221 and No. 51-29425), a catalyst comprising a palladium salt of certain kinds of heteropolyacids (see, Japanese Unexamined Patent Publication No. 54-57488) or a catalyst comprising a 3-group system oxygen compound (see, Japanese Unexamined Patent Publication No. 46-6763).

In recent years, a process for producing acetic acid from ethylene and oxygen through a gas phase single stage using a catalyst comprising metal palladium and at least one compound selected from heteropolyacids and/or salts thereof (see, Japanese Unexamined Patent Publications No. 7-89896 and No. 9-67298) has been proposed. According to the process using this catalyst, the acetic acid can be obtained in a relatively high yield.

Particularly important matters in industry to take account of in practicing the reaction using such a catalyst are the requirements that the catalyst has high activity, the change in the catalytic activity by aging is as small as possible and the selectivity of acetic acid is good.

Those conventionally proposed methods where acetic acid is obtained from ethylene and oxygen through a gas phase single stage using a catalyst comprising palladium and at least one compound selected from heteropolyacids and/or salts thereof are satisfied in view of practice in an industrial scale, however, if the catalytic activity can be more improved, this is economically advantageous.

DISCLOSURE OF INVENTION

It is an object of the present invention to provide a higher performance catalyst, a process for producing the catalyst, and a process for producing acetic acid using the catalyst, which are used in the process for producing acetic acid from ethylene and oxygen by a gas phase single-stage reaction using a catalyst comprising palladium and at least one compound selected from heteropolyacids and/or salts thereof.

For attaining the above-described object, the present inventors have made extensive investigations to elevate the performance of the catalyst comprising palladium and at least one compound selected from heteropolyacids and salts thereof, for use in the production of acetic acid from ethylene and oxygen. AS a result, it has been found that in the catalyst essentially comprising (a) palladium and (b) at least one compound selected from heteropolyacids and salts thereof, for use in the process for producing acetic acid by reacting ethylene and oxygen, when (c) a vanadium element and/or a molybdenum element is added in a specific ratio, the catalyst obtained can have high activity and be reduced in the changes by aging as compared with those obtained by conventional processes. The present invention has been accomplished based on this finding.

More specifically, the present invention (I) provides a catalyst for use in producing acetic acid, which is used in the process for producing acetic acid by ethylene and oxygen, wherein the catalyst comprises a support having supported thereon (a) palladium, (b) at least one compound selected from the group consisting of heteropolyacids and salts thereof and (c) a vanadium element and/or a molybdenum element, and the weight ratio of the compound of group (b) to the element of group (c) is in the range of the compound of group (b): the element of group (c) 1:0.0001 to 0.2.

The present invention (II) provides a catalyst for use in producing acetic acid, which is used in the process for producing acetic acid by reacting ethylene and oxygen, wherein the catalyst comprises a support having supported thereon (a) palladium, (b) at least one compound selected from the group consisting of heteropolyacids and salts thereof, (c) a vanadium element and/or a molybdenum element, and (d) at least one element selected from the group consisting of the elements belonging to Group 14, Group 15 and Group 16 of the Periodic Table, and the weight ratio of the compound of group (b) to the element of group (c) is in the range of the compound of group (b): the element of group (c) 1:0.0001 to 0.2.

The present invention (III) provides a catalyst for use in producing acetic acid, which is used in the process for producing acetic acid by reacting ethylene and oxygen, wherein said catalyst comprises a support having supported thereon (a) metal palladium, (b) at least one compound selected from the group consisting of heteropolyacids and salts thereof, (c) a vanadium element and/or a molybdenum element, and (e) at least one element selected from the group consisting of the elements belonging to Group 7, Group 8, Group 9, Group 10, Group 11 and Group 12 of the Periodic Table, and the weight ratio of the compound of group (b) to the element of group (c) is in the range of the compound of group (b): the element of group (c)=1 0.0001 to 0.2.

The present invention (IV) provides a process for producing the catalyst for use in producing acetic acid described in any one of the inventions (I) to (II).

The present invention (V) provides a process for producing acetic acid from ethylene and oxygen using a catalyst for use in producing acetic acid described in any one of the inventions (I) to (III).

BRIEF DESCRIPTION OF DRAWINGS

FIG. 2 is a graph showing the changes in the catalytic activity by aging in Example 30 (the reaction using catalyst 19 obtained in Example 19) and Comparative Example 21 (the reaction using catalyst 25 obtained in Comparative Example 16).

BEST MODE FOR MODE FOR CARRYING OUT THE INVENTION

Figure 1:
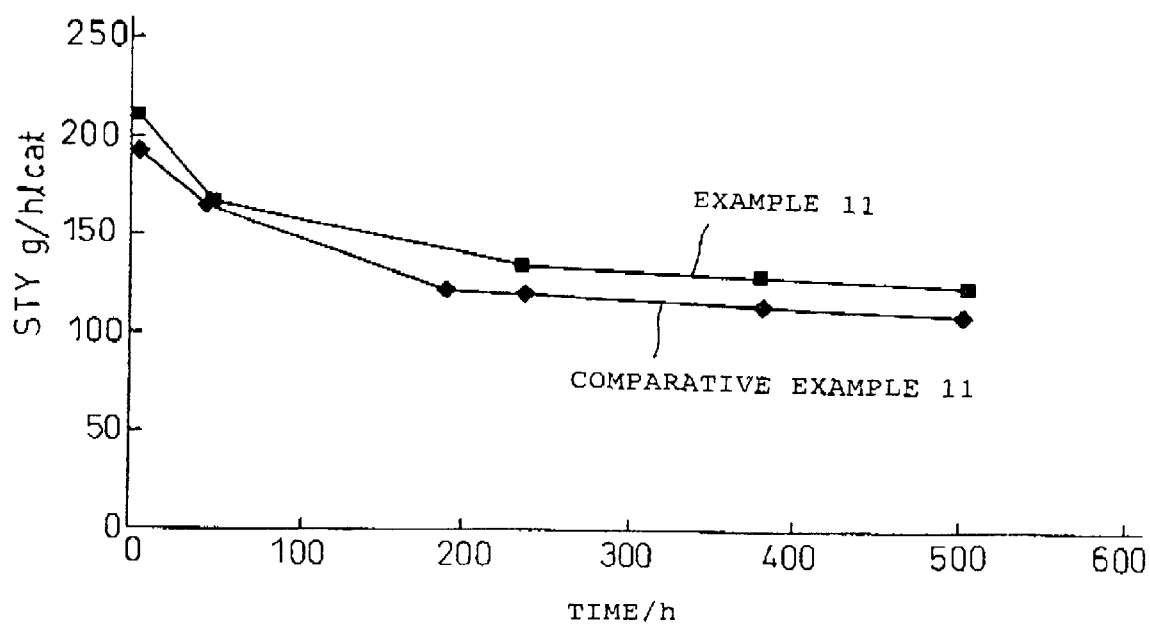
FIG. 1 is a graph showing the changes in the catalytic activity by aging in Example 11 (the reaction using catalyst 5 obtained in Example 5) and Comparative Example 11 (the reaction using catalyst 10 obtained in Comparative Example 5).

Description of the Catalyst for Use in Producing Acetic Acid According to the Inventions (I) to (III)

Catalyst of the Invention (I)

The present invention (I) is a catalyst for use in producing acetic acid, which is used in the process for producing acetic acid by ethylene and oxygen, wherein the catalyst comprises a support having supported thereon (a) palladium, (b) at least one compound selected from the group consisting of heteropolyacids and/or salts thereof (hereinbelow referred to as the compound of group (b) and (c) a vanadium element and/or a molybdenum element (hereinbelow referred to as the element of group (c), and the weight ratio of the compound of group (b) to the element of group (c) is in the range of the compound of group (b): the element of group (C)=1:0.0001 to 0.2.

The palladium for use in the present invention (I) may have any valance number and preferably is metal palladium which has a valence number of 0. The metal palladium can usually be obtained by reducing divalent and/or tetravalent palladium ion using a reducing agent such as hydrazine or hydrogen. In this case, the palladiums all are not necessary to be in the metal state.

The heteropolyacids used in the invention (I) as the compound of group (b) are not particularly limited and may be ones obtained by the condensation of two or more inorganic oxygen acids. Examples of the hetero-atom thereof include phosphorus, silicon, boron, aluminum, germanium, titanium, zirconium, cerium, cobalt and chromium, and examples of the poly-atom include tungsten, niobium and tantalum. Specific examples of the heteropolyacids include silicotungstic acid, phosphotungstic acid and borotungstic acid. More preferably, there may be mentioned tungsten-type heteropolyacids comprising tungsten as the poly-acid such as silicotungstic acid and phosphotungstic acid. Further, the tungsten-type heteropolyacids known as having Keggin structure and represented by the following chemical formula are practically preferred, but the heteropolyacids on the catalyst all are not necessary to be of the structure:

| 1-12-Phosphotungstic acid | $H_3[PW_{12}O_{40}].xH_2O$ |
|---|---|
| 1-12-Silicontungstic acid | $H_4[SiW_{12}O_{40}].xH_2O$ | wherein x is an integer of at least 1.

As heteropolyacids other than those of the Keggin structure there are known those having Wels-Dorthon or Anderson-Evans-Pearoff structure. The heteropolyacids are also known as "polyoxoanion", "polyoxometal salt" or "metal oxide cluster". Heteropolyacids usually have a high molecular weight, e.g., in the range of 500 to 10,000, and include polymeric complexes such as dimeric and trimeric complexes.

The salt of the heteropolyacid used in the invention (I) as the compound of group (b) is a metal salt where a part or all of the hydrogen atoms of an acid resulting from the condensation of two or more inorganic oxygen acids are replaced by a metal element, or an onium salt. The element which replaces the hydrogen atom of the heteropolyacid may be at least one element selected from the group consisting of the elements belonging to Group 1 to Group 16 of the Periodic Table. Examples of the onium salt of the heteropolyacid include ammonium salts. Among these heteropolyacid salts, lithium, sodium, potassium, cesium, magnesium, barium, copper, gold, gallium, chromium, manganese, cobalt and nickel salts are preferred.

Examples of the heteropolyacid salt preferred in view of the catalytic performance and the practical use include lithium phosphotungstate, sodium phosphotungstate, copper phosphotungstate, lithium silicotungstate, sodium silicotungstate and copper silicotungstate, however, the present invention is by no means limited thereto.

The state of the vanadium element and/or molybdenum element used in the invention (I) as the element of group (c) is not particularly limited, and they may be in a metal state or in a compound state. Specific examples thereof include oxides Such as vanadium dioxide, vanadium pentoxide and molybdenum trioxide, or heteropolyacids having the vanadium element and/or molybdenum element in the skeleton and their salts, however, the present invention is by no means limited thereto.

The heteropolyacids having in the skeleton the vanadium element and/or molybdenum element as the element of group (c) used in the invention (I) is not particularly limited as far as they contain at least one of the vanadium element and/or molybdenum element. Specific examples thereof include phosphomolybdic acid, silicomolybdic acid, boromolybdic acid, phosphovanadomolybdic acid, silicovanadomolybdic acid, borovanadomolybdic acid, phosphovanadotungstic acid, silicovanadotungstic acid and borovanadotungstic acid, however, the present invention is by no means limited thereto.

As the heteropolyacids having the vanadium element and/or molybdenum element as the element of group (c) in the skeleton, the following heteropolyacids are particularly preferred:

| Phosphomolybdic acid | $H_3[PMo_{12}O_{40}].xH_2O$ |
|---|---|
| Silicomolybdic acid | $H_4[SiMo_{12}O_{40}].xH_2O$ |
| Silicovanadotungstic acid | $H_{4+n}[SiV_nW_{12-n}O_{40}].xH_2O$ |
| Phosphovanadotungstic acid | $H_{3+n}[PV_nW_{12-n}O_{40}].xH_2O$ |
| Silicovanadomolybdic acid | $H_{4+n}[SiV_nMo_{12-n}O_{40}].xH_2O$ |
| Phosphovanadomolybdic acid | $H_{3+n}[PV_nMo_{12-n}O_{40}].xH_2O$ |
| Silicomolybdotungstic acid | $H_{4+n}[SiMo_nW_{12-n}O_{40}].xH_2O$ |
| Phosphomolybdotungstic acid | $H_{3+n}[PMo_nW_{12-n}O_{40}].xH_2O$ | wherein n is an integer of 1 to 11, and x is an integer of at least 1.

The salt of the heteropolyacid containing the vanadium element and/or molybdenum element as the element of group (c) is a metal salt where a part or all of the hydrogen atoms of an acid resulting from the condensation of two or more inorganic oxygen acids are replaced by a metal element, or an onium salt. Examples of the element of the metal salt include at least one element selected from the group consisting of the elements belonging to Group 1 to Group 16 of the Periodic Table. Examples of the onium salt include ammonium salts with ammonium or an amine. Among these heteropolyacid salts, lithium, sodium, potassium, cesium, magnesium, barium, copper, gold, gallium, chromium, manganese, cobalt and nickel salts are preferred.

Specific examples of the salt of the heteropolyacid containing the vanadium element and/or molybdenum element as the element of group (c) which is preferred in view of the catalytic performance and the practical use include lithium phosphovanadotungstate, sodium phosphovanadotungstate, copper phosphovanadotungstate, lithium silicovanadotungstate, sodium silicovanadotungstate, copper silicovanadotungstate, sodium phosphovanadomolybdate and sodium silicovanadomolybdate, however, the present invention is by no means limited thereto.

The support for use in the present invention (I) is not particularly limited and a porous substance commonly used as a support may be used. Preferred examples of the support include silica, alumina, silica-alumina, diatomaceous earth, montmorillonite and titania, with silica being more preferred. The shape of the support is not particularly limited and specific examples thereof include powder form, spherical form and pellet form, however, the present invention is by no means limited thereto.

The particle size of the support for use in the present invention (I) is also not particularly limited but it is preferably from 1 to 10 mm, more preferably from 3 to 8 mm. In the case of performing the reaction by filling the catalyst in a tube reactor, if the particle size is less than 1 mm, a pressure loss may be generated on passing of the gas therethrough and the gas may not be effectively circulated. If the particle size exceeds 10 mm, the reaction gas may not diffuse inside the catalyst and the catalytic reaction may not effectively proceed.

The pore structure of the support is not particularly limited but the pore diameter is preferably from 1 to 1,000 nm, more preferably from 2 to 800 nm.

The structure of the catalyst of the invention (I) is not accurately recognized, but the (a) palladium is preferably palladium in a metal state and the compound of group (b) has a clear structure, different from a composite oxide, and is acidic. The element of group (c) is considered to exist in the quite vicinity of (a) and (b). Thus, the catalyst is considered to exhibit higher activity and a catalytic performance with smaller change by aging as compared with conventional catalysts due to the interaction among the (a) palladium, the compound of group (b) and the element of group (c).

In the catalyst of the present invention (I) comprising a support having held thereon the (a) palladium, the compound of group (b) and the element of group (c), the composition of (a), (b) and (c) is preferably such that (a) is from 0.1 to 10 wt %, (b) is from 0.1 to 90 wt %, and (c) is in terms of the weight ratio to (b), in the range of the compound of group (b): the element of group (c)=1:0.0001 to 0.2, more preferably such that (a) is from 0.5 to 5.0 wt %, (b) is from 1.0 to 50 wt %, and (c) is in terms of the weight ratio to (b), in the range of the compound of group (b): the element of group (c)=1:0.0001 to 0.2, for attaining better results.

Particularly, in the catalyst of the invention (I), where the compound containing the element of group (c) is a heteropolyacid containing the vanadium element and/or molybdenum element (hereinbelow referred to as heteropolyacid of group (c)) and/or its salt, the composition of (a), (b) and (c) is preferably such that (a) is from 0.1 to 10 wt %, (b) is from 0.1 to 90 wt %, and (c) is in terms of the weight ratio to (b), in the range of the compound of group (b): the heteropolyacid of group (c)=1:0.005 to 0.2, more preferably such that (a) is from 0.1 to 5.0 wt %, (b) is from 0.1 to 50 wt %, and (c) is in terms of the weight ratio to (b), in the range of the compound of group (b): the heteropolyacid of group (c)=1:0.005 to 0.2, for attaining better results.

The heteropolyacids and/or their salts are considered to have various hydrous structures in the catalyst of the present invention. The weight for the heteropolyacids and/or their salts as used herein refers to a value calculated for the molecular formula of an anhydrous compound.

According to the catalyst for use in producing acetic acid described in the claims and the detailed description of the invention of Japanese Unexamnined Patent Publications No. 7-89896 and No. 9-67298 cited hereinabove as the background arts, one constituent element of the catalyst is a vanadium element and/or a molybdenum element as the element of group (c), however, the effectiveness of a catalyst containing the compound of group (b) and the element of group (c) in a specific proportion is not described. The present inventors have intensively studied on this point.

AS a result, it has been surprisingly found that in the constituent elements of the catalyst for use in producing acetic acid according to the present invention (I), when the weight ratio of the compound of group (b) to the element of group (c) is in the range of the compound of group (b): the element of group (c)=1:0.0001 to 0.2, preferably 1:0.0002 to 0.15, the space time yield of acetic acid is elevated and the catalyst is reduced in the change by aging.

The reason why the catalytic activity is improved and the change by aging is reduced when the compound of group (b) and the element of group (c) are mixed at a specific weight ratio is not yet accurately elucidated at present but is presumed as follows.

It has hitherto been known that vanadium and molybdenum are used as an oxidation catalyst, but the vanadium element and/or the molybdenum element alone is not effective for the process for producing acetic acid from ethylene through a single stage. In fact, it has been confirmed, as shown in the Examples, that they cannot provide a high activity in the process for producing acetic acid from ethylene through a single stage. Even in the combination of the (a) palladium and the vanadium element and/or molybdenum element (c) or the combination of the compound of group (b) and the vanadium element and/or molybdenum element (c), acetic acid could not be obtained with a high activity. Further, it has been proved that the catalytic activity and the selectivity of acetic acid vary depending on the proportions of the element of group (c) added to the catalyst consisting of the (a) palladium and the compound of group (b), and there are ranges in the proportions in which the catalytic performance is improved or deteriorated as 1 compared with conventional ones. Thus, it has been found from the results of extensive studies that the ratio of the element of group (c) to the compound of group (b) is important.

For example, when the weight ratio of the element of group (c) to the compound of group (b) is as small as less than the compound of group (b): the element of group (c) 1:0.0001, a sufficient interaction may not caused between the compound of group (b) and the element of group (c) and the effect may not be brought out. On the other hand, when the weight ratio of the element of group (c) to the compound of group (b) is greater than the compound of group (b): the element of group (c)=1:0.2, the interaction of the element of group (c) to the compound of group (b) may become too large and the reaction activity and selectivity may be reduced to lower the productivity of acetic acid as compared with conventional ones.

Because of these reasons, it is considered that the weight ratio between the compound of group (b) and the element of group (c) has an optimal value.

Further, in the catalysts for producing acetic acid described in the claims and the detailed description of the invention of Japanese Unexamined Patent Publications No. 7-89896 and No. 9-67298 cited hereinabove, one constituent element of the catalyst is a heteropolyacid containing vanadium and/or molybdenum, i.e., the heteropolyacid of group (c), however, the effectiveness of a catalyst containing the compound of group (b) and at least one compound selected from the group consisting of the heteropolyacids of group (c) and their salts in a specific proportion is not described. The present inventors have intensively studied on this point.

As a result, it has been surprisingly found that in the constituent elements of the catalyst for use in producing acetic acid according to the invention (I), when the weight ratio of the compound of group (b) to the at least one compound selected from the group consisting of the heteropolyacids of group (c) and their salts is in the range of the compound of group (b): the at least one compound selected from the group consisting of the heteropolyacids of group (c) and their salts=1:0.005 to 0.2, preferably 1:0.007 to 0.15, the space time yield of acetic acid is elevated and the catalyst is reduced in the change by aging. The heteropolyacids and/or their salts are considered to have various hydrous structures in the catalyst of the present invention. The weight for the heteropolyacids and/or their salts as used herein refers to a value calculated for the molecular formula of an anhydrous compound.

The reason why the catalytic activity is improved and the change by aging is reduced when the compound of group (b) and the at least one compound selected from the group consisting of the heteropolyacids of group (c) and their salts are mixed at a specific weight ratio is not yet accurately elucidated at present but is presumed as follows.

As described in Japanese Unexamined Patent Publications No. 7-89896 and No. 9-67298, where the at least one compound selected from the group consisting of the heteropolyacids of group (c) and their salts is used alone, it exhibits lower activity and selectivity than the compound of group (b). In fact, the effects have been confirmed in the Examples and Comparative Examples described hereinbelow. Thus, it can be said that the interaction between the compound (b) and the at least one compound selected from the group consisting of the heteropolyacids of group (c) and their salts is an important factor for the production of acetic acid from ethylene and oxygen.

For example, when the weight ratio of the at least one compound selected from the group consisting of the heteropolyacids of group (c) and their salts to the compound of group (b) is as small as less than the compound of group (b): the heteropolyacid of group (c)=1:0.005, a sufficient interaction may not be caused between the compound of group (b) and the at least one compound selected from the group consisting of the heteropolyacids of group (c) and their salts and the effect may not be brought out.

On the other hand, when the weight ratio of the at least one compound selected from the group consisting of the heteropolyacids of group (c) and their salts to the compound of group (b) is greater than the compound of group (b): the at least one compound selected from the group consisting of the heteropolyacids of group (c) and their salts=1:0.2, it is considered that the reaction activity and selectivity are reduced and the change by aging are increased as compared with a catalyst in which the compound of group (b) is used alone since the amount of the at least one compound selected from the group consisting of the heteropolyacids of group (c) and their salts is increased.

Because of these reasons, it is considered that the weight ratio between the compound of group (b) and the at least one compound selected from the group consisting of the heteropolyacids of group (c) and their salts has an optimal value.

Catalyst of the Invention (II)

The present invention (II) is a catalyst for use in producing acetic acid, which is used in the process for producing acetic acid by reacting ethylene and oxygen, wherein the catalyst comprises a support having supported thereon (a) palladium, (b) at least one compound selected from the group consisting of heteropolyacids and salts thereof, (c) a vanadium element and/or a molybdenum element, and (d) at least one element selected from the group consisting of the elements belonging to Group 14, Group 15 and Group 16 of the Periodic Table (hereinbelow referred to as the element of group (d)), and the weight ratio of the compound of group (b) to the element of group (c) is in the range of the compound of group (b): the element of group (c)=1:0.0001 to 0.2.

The catalyst of the present invention (II) is a 4-component catalyst containing the element of group (d) in the catalyst of the present invention (I). Here, the (a) palladium, the compound of group (b) and the element of group (c) are the same as those used in the catalyst of the present invention (I). The support is also the same as in the catalyst of the present invention (I).

With respect to the element of group (d) for use in the present invention (II), specific examples thereof include tin, lead, antimony, bismuth, selenium and tellurium. Among these, preferred are selenium and tellurium.

In the catalyst of the present invention (II) comprising (a) palladium, the compound of group (b), the element of group (c) and the element of group (d), the composition of (a), (b), (c) and (d) is preferably such that (a) is from 0.1 to 10 wt %, (b) is from 0.1 to 90 wt %, (c) is in terms of the weight ratio to (b), in the range of the compound of group (b): the element of group (c)=1:0.0001 to 0.2, and (d) is from 0.01 to 5.0 wt %, more preferably such that (a) is from 0.5 to 5.0 wt %, (b) is from 1.0 to 50 wt %, (c) is in terms of the weight ratio to (b), in the range of the compound of group (b): the element of group (c)=1:0.0005 to 0.15, and (d) is from 0.05 to 2.0 wt %, for attaining better results.

Similarly to the catalyst of the present invention (I), the weight ratio between the compound of group (b) to the element of group (c) is important and the weight ratio is in the range of the compound of group (b): the element of group (c) 1:0.0001 to 0.2, preferably 1:0.0002 to 0.15.

In particular, where the compound comprising the element of group (c) in the catalyst of the invention (II) is a heteropolyacid containing the vanadium element and/or molybdenum element and/or its salt, in the catalyst of the invention (II) comprising the (a) palladium, the compound of group (b), at least one compound selected from the heteropolyacids of group (c) and their salts and the element of group (d), the composition of (a), (b), (c) and (d) is preferably such that (a) is from 0.1 to 10 wt %, (b) is from 0.1 to 90 wt %, (c) is in terms of the weight ratio to (b), in the range of the compound of group (b): the at least one compound selected from the heteropolyacids of group (c) and their salts=1:0.005 to 0.2, and (d) is from 0.01 to 5.0 wt %, more preferably such that (a) is from 0.5 to 5.0 wt %, (b) is from 1.0 to 50 wt %, (c) is in terms of the weight ratio to (b), in the range of the compound of group (b): the at least one compound selected from the heteropolyacids of group (c) and their salts=1:0.005 to 0.2, and (d) is from 0.05 to 2.0 wt %, for attaining better results.

Similarly to the catalyst of the present invention (I), the weight ratio between the compound of group (b) to the element of group (c) is important and the weight ratio is in the range of the compound of group (b): the element of group (c) 1:0.0001 to 0.2, preferably 1:0.0002 to 0.15.

In particular, where the compound comprising the element of group (c) in the catalyst of the invention (II) is a heteropolyacid containing the vanadium element and/or molybdenum element and/or its salt, in the catalyst of the invention (II) comprising the (a) palladium, the compound of group (b), at least one compound selected from the heteropolyacids of group (c) and their salts and the element of group (d), the composition of (a), (b), (c) and (d) is preferably such that (a) is from 0.1 to 10 wt %, (b) is from 0.1 to 90 wt %, (c) is in terms of the weight ratio to (b), in the range of the compound of group (b): the at least one compound selected from the heteropolyacids of group (c) and their salts=1:0.005 to 0.2, and (d) is from 0.01 to 5.0 wt %, more preferably such that (a) is from 0.5 to 5.0 wt %, (b) is from 1.0 to 50 wt %, (c) is in terms of the weight ratio to (b), in the range of the compound of group (b): the at least one compound selected from the heteropolyacids of group (c) and their salts=1:0.005 to 0.2, and (d) is from 0.05 to 2.0 wt %, for attaining better results.

Similarly to the catalyst of the invention (I), the weight ratio between the compound of group (b) and the at least one compound selected from the heteropolyacids of group (c) and their salts is important and the weight ratio is preferably in the range of the compound of group (b): the at least one compound selected from the heteropolyacids of group (c) and their salts=1:0.005 to 0.2, more preferably in the range of the compound of group (b): the at least one compound selected from the heteropolyacids of group (c) and their salts=1:0.007 to 0.15. The heteropolyacids and/or their salts are considered to have various hydrous structures in the catalyst of the present invention. The weight for the heteropolyacids and/or their salts as used herein refers to a value calculated for the molecular formula of an anhydrous compound.

Catalyst of the Invention (III)

The present invention (III) is a catalyst for use in producing acetic acid, which is used in the process for producing acetic acid by reacting ethylene and oxygen, wherein said catalyst comprises a support having supported thereon (a) palladium, (b) at least one compound selected from the group consisting of heteropolyacids and salts thereof, (c) a vanadium element and molybdenum element, (d) at least one element selected from the Group consisting of the elements belonging to Group 14, Group 15 and Group 16 of the Periodic Table and (e) at least one element selected from the group consisting of the elements belonging to Group 7, Group 8, Group 9, Group 10, Group 11 and Group 12 of the Periodic Table (hereinbelow referred to as the element of group (e)), and the weight ratio of the compound of group (b) to the element of group (c) is in the range of the compound of group (b): the element of group (c)=1:0.0001 to 0.2.

The catalyst of the present invention (III) is a 5-component catalyst containing the element of group (e) in the catalyst of the present invention (II). Here, the (a) palladium, the compound of group (b), the element of group (c) and the element of group (d) for use in the catalyst of the present invention (III) are the same as those used in the catalyst of the present invention (II). The support is also the same as in the catalyst of the present invention (II).

With respect to the element of group (e) for use in the present invention (III), specific examples thereof include chromium, manganese, rhenium, ruthenium, rhodium, nickel, gold and zinc. Among these, copper, gold and zinc are preferred.

In the catalyst of the present invention (III) comprising the (a) palladium, the compound of group (b), the element of group (c), the element of group (d) and the element of group (e), the composition of (a), (b), (c), (d) and (e) is preferably such that (a) is from 0.1 to 10 wt %, (b) is from 0.1 to 90 wt %, (c) is in terms of the weight ratio to (b), in the range of the compound of group (b): the element of group (c)= 1:0.0001 to 0.2, (d) is from 0.01 to 5.0 wt %, and (e) is from 0.01 to 5.0 wt %, more preferably such that (a) is from 0.5 to 5.0 wt %, (b) is from 1.0 to 50 wt %, (c) is in terms of the weight ratio to (b), in the range of the compound of group (b): the element of group (c)=1:0.0005 to 0.15, (d) is from 0.05 to 2.0 wt %, and (e) is from 0.05 to 2.0 wt %.

Similarly to the catalyst of the present invention (I), the weight ratio between the compound of group (b) to the element of group (c) is important and the weight ratio is preferably in the range of the compound of group (b): the element of group (c)=1:0.0001 to 0.2, more preferably 1:0.0002 to 0.15.

In particular, where the compound comprising the element of group (c) in the catalyst of the invention (III) is a heteropolyacid containing the vanadium element and/or molybdenum element and/or its salt, in the catalyst of the invention (III) comprising the (a) palladium, the compound of group (b), at least one compound selected from the heteropolyacids of group (c) and their salts, the element of group (d) and the element of group (e), the composition of (a), (b), (c), (d) and (e) is preferably such that (a) is from 0.1 to 10 wt %, (b) is from 0.1 to 90 wt %, (c) is in terms of the weight ratio to (b), in the range of the compound of group (b): the at least one compound selected from the heteropolyacids of group (c) and their salts=1:0.005 to 0.2, (d) is from 0.01 to 5.0 wt %, and (e) is from 0.01 to 5.0 wt %, more preferably such that (a) is from 0.5 to 5.0 wt %, (b) is from 1.0 to 50 wt %, (c) is in terms of the weight ratio to (b), in the range of the compound of group (b): the at least one compound selected from the heteropolyacids of group (c) and their salts=1:0.005 to 0.2, (d) is from 0.05 to 2.0 wt %, and (e) is from 0.05 to 2.0 wt %, for attaining better results.

Similarly to the catalyst of the invention (I), the weight ratio between the compound of group (b) and the at least one compound selected from the heteropolyacids of group (c) and their salts is important and the weight ratio is preferably in the range of the compound of group (b): the at least one compound selected from the heteropolyacids of group (c) and their salts=1:0.005 to 0.2, more preferably in the range of the compound of group (b): the at least one compound selected from the heteropolyacids of group (c) and their salts=1:0.007 to 0.15. The heteropolyacids and/or their salts are considered to have various hydrous structures in the catalyst of the present invention. The weight for the heteropolyacids and/or their salts as used herein refers to a value calculated for the molecular formula of an anhydrous compound.

Elemental Analysis Method

The amount of the elements contained in the catalysts of the inventions (I) to (III) can be measured by the following method. A predetermined amount of catalyst is pulverized in a mortar or the like into uniform powder and the catalyst powder obtained is added to an acid such as hydrofluoric acid or aqua regia and dissolved while stirring under heating to form a uniform solution. The resulting solution is diluted with ion-free pure water into an appropriate concentration to form a solution for the analysis. This solution is quantitated by an inductively coupled plasma emission spectrometer (for example, SPS-1700 manufactured by Seiko Instruments Inc.). The precision of the apparatus can be easily corrected using a commercially available standard reagent for each element and the quantitation can have reproducibility.

Process for Producing Catalyst for Use in Producing Acetic Acid: Present Invention (IV)

The present invention (IV) is a process for producing the catalysts for use in producing acetic acid according to the inventions (I) to (III).

Production Process (1) of the Present Invention (IV)

The production process (1) of the present invention (IV) is a process for producing the catalyst of the present invention (I), comprising the following first and second steps:
First Step
A step for loading (a) palladium on a support to obtain a palladium supported catalyst.
Second Step
A step for loading the compound of group (b) and the element of group (c) on the (a) palladium supported catalyst obtained in the first step to obtain a catalyst for use in producing acetic acid.

The first step is a step for loading (a) palladium on a support to obtain (a) palladium supported catalyst.

In the production process (1) of the present invention (IV), the starting material compound of the (a) palladium is not particularly limited. Specifically, there may be used metal palladium, halides such as palladium chloride, organic acid salts such as palladium acetate, inorganic acid salts such as palladium nitrate, palladium oxide, sodium tetrachloropalladate and potassium tetrachloropalladate, as well as complexes containing as ligands organic compounds such as acetylacetonato, nitrile and ammonium, with sodium tetrachloropalladate, potassium tetrachloropalladate and palladium nitrate being particularly preferred.

The method for loading the (a) palladium, on a support is not particularly limited and any method may be used. For example, it may be loaded on a support by dissolving the starting compound in an appropriate solvent such as water or acetone or in an inorganic or organic acid such as hydrochloric acid, nitric acid or acetic acid, or a solution thereof, impregnating the support with the dissolution product and then drying the impregnated support.

Preferably, the (a) palladium is converted into a metal state after the loading of the (a) palladium at the first step. The method for converting it into metal palladium is not particularly limited and a known method may be used. Specifically, a method of reducing the palladium compound supported catalyst as it is or after treating it with an aqueous solution of sodium hydroxide, sodiumm metasilicate and/or barium hydroxide into metal palladium using an appropriate reducing agent such as hydrazine or hydrogen, may be used.

When the (a) palladium is converted into the metal state, the converting operation may be performed after isolating the palladium supported catalyst or subsequently to the loading operation. If possible in view of the conditions, the converting operation is preferably performed subsequently to the loading operation without isolating the catalyst.

Thus, a (a) palladium supported catalyst can be obtained.

Preferably, the palladium (a) is converted into a metal state after the loading of the palladium (a) at the first step. The method for converting it into metal palladium is not particularly limited and a known method may be used. Specifically, a method of reducing the palladium compound supported catalyst as it is or after treating it with an aqueous solution of sodium hydroxide, sodiumm metasilicate and/or barium hydroxide into metal palladium using an appropriate reducing agent such as hydrazine or hydrogen, may be used.

When the palladium (a) is converted into the metal state, the converting operation may be performed after isolating the palladium supported catalyst or subsequently to the loading operation. If possible in view of the conditions, the converting operation is preferably performed subsequently to the loading operation without isolating the catalyst.

Thus, a palladium supported catalyst (a) can be obtained.

The second step in the production process (1) of the present invention (IV) is a step for loading the compound of group (b) and the element of group (c) on the palladium supported catalyst obtained in the first step to obtain the catalyst of the present invention (I).

In the second step, the compound of group (b) is the same as in the catalyst of the present invention (I).

The starting material of the element of group (c) used at the second step is not particularly limited and may include the element itself, or oxides, chlorides and sulfides containing the element. Specifically, there may be mentioned, for example., chlorides such as vanadium trichloride, vanadyl chloride and vanadyl oxychloride, oxides such as vanadium dioxide, vanadium trioxide, vanadium pentoxide, vanadic acid, molybdic acid, metavanadic acid, ammonium metavanadate, sodium metavanadate, ammonium molybdate, potassium molybdate and salts thereof, sulfatovanadic acid and vanadyl sulfate, as well as complexes containing as ligands organic compounds such as acetylacetonato and heteropolyacids containing vanadium and/or molybdenum in the skeleton and salts thereof.

Specific examples of the heteropolyacids and salts thereof include phosphomolybdic acid, phosphovanadomolybdic acid, phosphovanadotungstic acid, silicomolybdic acid, silicovanadomolybdic acid and silicovanadotungstic acid.

Preferably, the starting material of the element of group (c) may include ammonium metavanadate, ammonium molybdate, and the heteropolyacids containing vanadium and/or molybdenum in the skeleton.

The method for loading the compound of group (b) on a support is not particularly limited and a known method may be used. Specific examples of the loading method include impregnation, spraying, evaporation to dryness, kneading and adhesion, however, the present invention is by no means limited thereto. The solvent used in the impregnation may be any as long as it dissolves inorganic acids, and water, an organic solvent or a mixture thereof, preferably water or an alcohol, is used.

The method for loading the element of group (c) on a support is not particularly limited and a known method may be used. Specific examples of the loading method include impregnation, spraying, evaporation to dryness, kneading and adhesion, however, the present invention is by no means limited thereto. The solvent used in the impregnation may be any as long as it dissolves inorganic acids, and water, an organic solvent or a mixture thereof, preferably water or an alcohol, is used.

The loading of the compound of group (b) and the loading of the element of group (c) may be in any order.

More specifically, respective loading operations may be performed simultaneously or one after another. In general, those loading operations are preferably performed at the same time.

Thus, the catalyst of the present invention (I) can be obtained.

Production Process (2) of the Present Invention (IV)

The production process (2) of the present invention (IV) is a process for producing the catalyst of the present invention (II).

The catalyst of the present invention (II) can be produced by adding the element of group (d) in either one or both of the first and second steps of the production process (1) of the present invention (IV).

The first step is a step for loading the (a) palladium or palladium and the element of group (d) on a support to obtain a (a) palladium supported catalyst.

The starting material compound of the (a) palladium, the converting method into a metal state, and the method for loading it on a support for use in the first step are the same as in the first step of the production process (1) of the catalyst of the present invention (I) in the present invention (IV).

Specific examples include chlorides such as selenium chloride, tellurium chloride, bismuth chloride and lead chloride, nitrates such as antimony nitrate, tin nitrate, bismuth nitrate and lead nitrate, acetates such as tin acetate, bismuth acetate and lead acetate, selenium oxide, selenic acid ($H_4SeO_6$) and/or salts thereof, selenious acid ($H_2SeO_3$) and/or salts thereof, tellurium oxide, telluric acid ($H_6TeO_6$) and/or salts thereof, tellurous acid ($H_2TeO_3$) and/or salts thereof, metal tellurium, and potassium antimonate, however, the present invention is by no means limited thereto. Preferably, there may be mentioned sodium tellurite, potassium tellurite, telluric acid, potassium selenite and the like.

The method for loading the element of group (d) on a support is not particularly limited and any method may be used. For example, the starting material compound of the element of group (d) can be loaded on a support by dissolving it in an appropriate solvent such as water or acetone or in an inorganic or organic acid such as hydrochloric acid, nitric acid or acetic acid, impregnating the support with the dissolution product and then drying the impregnated support.

Examples of the loading method include impregnation, evaporation to dryness, kneading and spraying, however, the present invention is by no means limited thereto.

The loading of the (a) palladium on a support and the loading of the element of group (d) on the support may be in any order. More specifically, respective loading operations may be performed simultaneously or one after another. In general, the loading of the element of group (d) is preferably performed at the same time with the loading of the starting material compound of the (a) palladium.

Thereafter, if desired, (a) palladium supported catalyst may be collected by filtration in a usual manner, washed with water so as to remove the reaction inhibitors having adverse effect in the catalytic reaction, such as halides and alkali salts, e.g., of sodium, and then dried.

Thus, a (a) palladium supported catalyst can be obtained.

The second step of the production process (2) of the present invention (IV) is a step for loading the compound of group (b) and the element of group (c) or these and the element of group (d) on the (a) palladium supported catalyst obtained in the first step to obtain the catalyst of the present invention (II).

In the second step, the starting material compound of the compound of group (b) and the method for loading it on a support are the same as in the second step of the production process (1) of the present invention (IV). Also, the starting material compound of the element of group (c) and the method for loading it on a support are the same as in the second step of the production process (1) of the present invention (IV). Furthermore, the starting material compound of the element of group (d) and the method for loading it on a support are the same as in the first step of the production process (2) of the present invention (IV).

In the second step, the loading of the compound of group (b), the loading of the element of group (c), and the loading of the element of group (d), on the support may be performed in any order. More specifically, respective loading operations may be performed simultaneously or one after another. In general, those loading operations are preferably performed at the same time.

Thus, the catalyst of the present invention (II) can be obtained.

Production Process (3) of the Present Invention (IV)

The production process (3) of the present invention (IV) is a process for producing the catalyst of the present invention (III).

The catalyst of the present invention (III) can be produced by adding the element of group (d) and the element of group (e) in either one or both of the first and second steps of the production process (1) of the present invention (IV).

The first step is a step for loading the (a) palladium and/or the element of group (d) and/or the element of group (e) on a support to obtain a (a) palladium supported catalyst.

The starting material compound of the (a) palladium, the converting method into a metal state, and the method for loading it on a support for use in the first step are the same as in the first step of the production process (1) of the catalyst of the present invention (I) in the present invention (IV).

With respect to the element of group (d) added in the first step, the starting material compound of the element of group (d) and the method for loading it on a support are the same as in the first step of the production process (2) of the catalyst of the present invention (II) in the present invention (IV).

With respect to the element of group (e) added in the first step, the starting material compound of the element of group (e) used in the preparation of the catalyst is not particularly limited. Examples thereof include, in addition to the element itself, halides, nitrates, acetates, phosphates, sulfates and oxides containing the element, and their complexes having as a ligand an organic material such as acetyl acetonate or nitrile. Specific examples include chlorides such as chromium chloride, manganese chloride, rhenium chloride, ruthenium chloride, rhodium chloride, iridium chloride, nickel chloride, tetrachloroaurate and salts thereof, and zinc chloride, nitrates such as chromium nitrate, manganese nitrate, nickel nitrate, iridium nitrate and zinc nitrate, and acetates such as chromium acetate, manganese acetate, rhenium acetate, ruthenium acetate, iridium acetate, nickel acetate and zinc acetate, however, the present invention is by no means limited thereto. Preferably, there may be mentioned tetrachloroaurate, zinc chloride, copper chloride, zinc nitrate and the like.

The method for loading the element of group (e) on a support is not particularly limited and any method may be used. For example, the starting material compound of the element of group (e) can be loaded on a support by dissolving it in an appropriate solvent such as water,or acetone or in an inorganic or organic acid such as hydrochloric acid, nitric acid or acetic acid, impregnating the support with the dissolution product and then drying the impregnated support. Examples of the loading method include impregnation, spraying, evaporation to dryness, kneading and spraying, however, the present invention is by no means limited thereto.

The loading of the (a) palladium on a support and/or the loading of the element of group (d) and/or the element of group (e) on the support may be in any order. More specifically, respective loading operations may be performed simultaneously or one after another. In general, the loading of the element of group (d) and/or the element of group (e) is preferably performed at the same time with the loading of the (a) palladium.

Thereafter, if desired, the (a) palladium supported catalyst may be collected by filtration in a usual manner, washed with water so as to remove the reaction inhibitors having adverse effect in the catalytic reaction, such as halides and alkali salts, e.g., of sodium, and then dried.

Thus, a metal palladium supported catalyst (a) can be obtained.

The second step of the production process (3) of the present invention (IV) is a step for loading the compound of group (b) and the element of group (c) or these and the element of group (d) and/or the element of group (e) on the palladium supported catalyst (a) obtained in the first step to obtain the catalyst of the present invention (III).

The second step of the production process (3) of the present invention (IV) is a step for loading the compound of group (b) and the element of group (c) or these and/or the element of group (d) and/or the element of group (e) on the (a) palladium supported catalyst obtained in the first step to obtain the catalyst of the present invention (III).

In the second step, the loading of the compound of group (b), the loading of the element of group (c), and/or the loading of the element of group (d) and/or the element of group (e), on the (a) palladium supported catalyst, may be performed in any order. More specifically, respective loading operations may be performed simultaneously or one after another. In general, those loading operations are preferably performed at the same time.

Thus, the catalyst of the present invention (III) can be obtained.

Production Process of Acetic Acid: Present Invention (V)

In the production process of acetic acid according to the present invention (V), the reaction temperature at the time of producing acetic acid by reacting ethylene and oxygen is not particularly limited, but it is preferably from 100 to 300° C., more preferably from 120 to 250° C. A reaction pressure practically advantageous in view of the equipment is from 0.0 to 3.0 MPa (gauge pressure), however, this is not particularly limited. The reaction pressure is more preferably from 0.1 to 1.5 MPa (gauge pressure).

In the production process of acetic acid according to the present invention, the gas feed into the reaction system contains ethylene and oxygen. If desired, a diluting agent such as nitrogen, carbon dioxide or a rare gas may also be used.

Based on the total amount of the gas feed, ethylene is fed to the reaction system to have a ratio of preferably from 5 to 80 vol %, more preferably from 8 to 50 vol %, and oxygen is fed to have a ratio of preferably from 1 to 15 vol %, more preferably from 3 to 12 vol %.

In this reaction system, when water is caused to be present in the reaction system, an extremely high effect can be provided on the improvement of the acetic acid producing activity and selectivity and on the maintenance of the catalytic activity. The steam is suitably contained in the reaction gas in an amount of from 1 to 50 vol %, preferably from 5 to 40 vol %.

In the production process of acetic acid according to the present invention (V), the starting material ethylene used is preferably a high-purity ethylene, however, a lower saturated hydrocarbon such as methane, ethane or propane may be mixed therein. The oxygen is preferably an oxygen diluted with an inert gas such as nitrogen or carbon dioxide gas, for example, the oxygen may be fed in the form of air. However, in the case of circulating the reaction gas, it is generally advantageous to use an oxygen having a high concentration, preferably a concentration of 99% or more.

In the standard state, the mixed reaction gas is preferably passed on the catalyst at a space velocity (SV) of from 10 to 15,000 hr$^{-1}$, more preferably from 300 to 8,000 hr$^{-1}$.

The form of reaction is not particularly limited and the reaction may be performed by a known method, for example, using a fixed bed or fluidized bed. A fixed bed where an anticorrosive reaction tube is filled with the above-described catalyst is preferably used and this is aadvantageous in view of the practical use.

The present invention is further illustrated below by referring to the Examples, however, these Examples are only to describe the present invention and the present invention should not be construed as being limited to these Examples.

Pretreatment of Support

In all Examples, the support was subjected to a drying pretreatment in an air at 110° C. for 4 hours.

Use of Water

In all Examples, the water used was deionized water.

EXAMPLE 1

A silica support [KA-1, produced by Südchemie A. G., 5 mmφ] (69 g) was impregnated with an aqueous solution (45 ml) of sodium tetrachloropalladate [$Na_2PdCl_4$, produced by Tanaka Kikinzoku] (3.80 g) to absorb the entire amount of the solution. Subsequently, the support was added to an aqueous solution (100 ml) of sodium metasilicate nonahydrate [$Na_2SiO_3.9H_2O$, produced by Wako Junyakul (8.0 g) and allowed to stand at room temperature for 20 hours. To this solution, hydrazine monohydrate [$N_2H_4.H_2O$, produced by Wako Junyaku] (6.5 g) was added and after gently stirring it, the solution was allowed to stand at room temperature for 4 hours to cause reduction into metal palladium. Thereafter, the catalyst was collected by filtration, subjected to decantation, transferred to a glass column with a stop cock, washed by passing therethrough pure water for 40 hours, and then dried at 110° C. for 4 hours in an air stream to obtain a metal palladium supported catalyst.

The thus-obtained metal palladium supported catalyst was impregnated with an aqueous solution (45 ml) containing silicotungstic acid hexacohydrate [$H_4SiW_{12}O_{40}.26H_2O$, produced by Japan Inorganic Colour & Chemical] (23.55 g) and ammonium metavanadate [$NH_4VO_3$, produced by Wako Junyaku] (0.053 g). The addition was made by once operation and the mixture was slowly stirred and rotated until the solution was thoroughly absorbed (about 3 minutes). After the impregnation, the wet impregnated support was allowed to stand at room temperature for 1 hour, then dried in an oven at 110° C. for 4 hours in an air stream and subsequently allowed to stand in a desiccator overnight, thereby obtaining Catalyst 1 for use in producing acetic acid.

17

EXAMPLE 2

Catalyst 2 for use in producing acetic acid was obtained by the same operation as in Example 1 except for using ammonium molybdate [$(NH_4)_6Mo_7O_{24}$, produced by Wako Junyaku] (0.885 g) in place of the ammonium metavanadate in Example 1.

EXAMPLE 3

A silica support (KA-1, produced by Südchemie A. G., 5 mmφ] (69 g) was impregnated with an aqueous solution (45 ml) of sodium tetrachloropalladate [$Na_2PdCl_4$, produced by Tanaka Kikinzoku] (3.80 g) to absorb the entire amount of the solution. Subsequently, the support was added to an aqueous solution (100 ml) of sodium metasilicate nonahydrate [$Na_2SiO_3.9H_2O$] (8.0 g) and allowed to stand at room temperature for 20 hours. To this solution, hydrazine monohydrate [$N_2H_4.H_2O$] (6.5 g) was added and after gently stirring it, the solution was allowed to stand at room temperature for 4 hours to cause reduction into metal palladium. Thereafter, the catalyst was collected by filtration, subjected to decantation, transferred to a glass column with a stop cock, washed by passing therethrough pure water for 40 hours, and then dried at 110° C. for 4 hours in an air stream to obtain a metal palladium supported catalyst.

The thus-obtained metal palladium supported catalyst was impregnated with an aqueous solution (45 ml) containing silicotungstic acid hexacohydrate [$H_4SiW_{12}O_{40}.26H_2O$] (23.55 g), telluric acid [$H_6TeO_6$, produced by Kanto Kagaku] (0.27 g) and ammonium metavanadate [$NH_4VO_3$] (0.053 g). The addition was made by once operation and the mixture was slowly stirred and rotated until the solution was thoroughly absorbed (about 3 minutes). After the impregnation, the wet impregnated support was allowed to stand at room temperature for 1 hour, then dried in an oven at 110° C. for 4 hours in an air stream and subsequently allowed to stand in a desiccator overnight, thereby obtaining Catalyst 3 for use in producing acetic acid.

EXAMPLE 4

A silica support [KA-1, produced by Südchemie A. G., 5 mmφ] (69 g) was impregnated with an aqueous solution (45 ml) containing sodium tetrachloropalladate [$Na_2PdCl_4$] (3.80 g) and tetrachloroaurate tetrahydrate [$H_4AuCl_4.4H_2O$, produced by Tanaka Kikinzoku] (0.78 g) to absorb the entire amount of the solution. Subsequently, the support was added to an aqueous solution (100 ml) of sodium metasilicate nonahydrate [$Na_2SiO_3.9H_2O$] (8.0 g) and allowed to stand at room temperature for 20 hours. To this solution, hydrazine monohydrate [$N_2H_4.H_2O$] (6.5 g) was added and after gently stirring it, the solution was allowed to stand at room temperature for 4 hours to cause reduction into metal palladium, Thereafter, the catalyst was collected by filtration, subjected to decantation, transferred to a glass column with a stop cock, washed by passing therethrough pure water for 40 hours, and then dried at 110° C. for 4 hours in an air stream to obtain a metal palladium supported catalyst.

The thus-obtained metal palladium supported catalyst containing gold and tellurium was impregnated with an aqueous solution (45 ml) containing silicotungstic acid hexacohydrate [$H_4SiW_{12}O_{40}.26H_2O$, produced by Japan Inorganic Colour & Chemical] (23.55 g) and ammonium metavanadate [$NH_4VO_3$] (0.053 g). The addition was made by once operation and the mixture was slowly stirred and rotated until the solution was thoroughly absorbed (about 3 minutes). After the impregnation, the wet impregnated support was allowed to stand at room temperature for 1 hour, then dried in an oven at 110° C. for 4 hours in an air stream and subsequently allowed to stand in a desiccator overnight, thereby obtaining Catalyst 4 for use in producing acetic acid.

The thus-obtained metal palladium supported catalyst containing gold and tellurium was impregnated with an aqueous solution (45 ml) containing silicotungstic acid hexacohydrate [$H_4SiW_{12}O_{40}.26H_2O$, produced by Nippon Muki-Kagaku Kogyo] (23.55 g) and ammonium metavanadate [$NH_4VO_3$] (0.053 g). The addition was made by once operation and the mixture was slowly stirred and rotated until the solution was thoroughly absorbed (about 3 minutes). After the impregnation, the wet impregnated support was allowed to stand at room temperature for 1 hour, then dried in an oven at 110° C. for 4 hours in an air stream and subsequently allowed to stand in a desiccator overnight, thereby obtaining Catalyst 4 for use in producing acetic acid.

EXAMPLE 5

Catalyst 5 for use in producing acetic acid was obtained by the same operation as in Example 4 except for using zinc chloride [$ZnCl_2$, produced by Wako Junyaku] (0.14 g) in place of the tetrachloroauric tetrahydrate in Example 4.

COMPARATIVE EXAMPLE 1

A silica support [KA-1, produced by Südchemie A. G., 5 mmφ] (69 g) was impregnated with an aqueous solution (45 ml) of sodium tetrachloropalladate [$Na_2PdCl_4$, produced by Tanaka Kikinzoku] (3.80 g) to absorb the entire amount of the solution. Subsequently, the support was added to an aqueous solution (100 ml) of sodium metasilicate nonahydrate [$Na_2SiO_3.9H_2O$, produced by Wako Junyaku] (8.0 g) and allowed to stand at room temperature for 20 hours. To this solution, hydrazine monohydrate [$N_2H_4.H_2O$, produced by Wako Junyaku] (6.5 g) was added and after gently stirring it, the solution was allowed to stand at room temperature for 4 hours to cause reduction into metal palladium. Thereafter, the catalyst was collected by filtration, subjected to decantation, transferred to a glass column with a stop cock, washed by passing therethrough pure water for 40 hours, and then dried at 110° C. for 4 hours in an air stream to obtain a metal palladium supported catalyst.

The thus-obtained metal palladium supported catalyst was impregnated with an aqueous solution (45 ml) of silicotungstic acid hexacohydrate [$H_4SiW_{12}O_{40}.26H_2O$, produced by Japan Inorganic Colour & Chemical] (23.55 g). The addition was made by once operation and the mixture was slowly stirred and rotated until the solution was thoroughly absorbed (about 3 minutes). After the impregnation, the wet impregnated support was allowed to stand at room temperature for 1 hour, then dried in an oven at 110° C. for 4 hours in an air stream and subsequently allowed to stand in a desiccator overnight, thereby obtaining Catalyst 6 for use in producing acetic acid.

COMPARATIVE EXAMPLE 2

A silica support [KA-1, produced by Südchemie A. G., 5 mmφ] (69 g) was impregnated with an aqueous solution (45 ml) of ammonium metavanadate [$NH_4VO_3$, produced by Wako Junyaku]. The addition was made by once operation and the mixture was slowly stirred and rotated until the solution was thoroughly absorbed (about 3 minutes). After the impregnation, the wet impregnated support was allowed to stand at room temperature for 1 hour, then dried in an oven at 110° C. for 4 hours in an air stream and subsequently allowed to stand in a desiccator overnight, thereby obtaining Catalyst 7 for use in producing acetic acid.

COMPARATIVE EXAMPLE 3

A silica support [KA-1, produced by Südchemie A. G., 5 mmφ] (69 g) was impregnated with an aqueous solution (45 ml) of sodium tetrachloropalladate [$Na_2PdCl_4$, produced by Tanaka Kikinzoku] (3.80 g) to absorb the entire amount of the solution. Subsequently, the support was added to an aqueous solution (100 ml) of sodium metasilicate nonahydrate [$NaSiO_3.9H_2O$, produced by Wako Junyaku] (8.0 g) and allowed to stand at room temperature for 20 hours. To this solution, hydrazine monohydrate [$N_2H_4.H_2O$, produced by Wako Junyaku] (6.5 g) was added and after gently stirring it, the solution was allowed to stand at room temperature for 4 hours to cause reduction into metal palladium. Thereafter, the catalyst was collected by filtration, subjected to decantation, transferred to a glass column with a stop cock, washed by passing therethrough pure water for 40 hours, and then dried at 110° C. for 4 hours in an air stream to obtain a metal palladium supported catalyst.

The thus-obtained metal palladium supported catalyst was impregnated with an aqueous solution (45 ml) of ammonium metavanadate [$NH_4VO_3$, produced by Wako Junyaku] (0.053 g). The addition was made by once operation and the mixture was slowly stirred and rotated until the solution was thoroughly absorbed (about 3 minutes). After the impregnation, the wet impregnated support was allowed to stand at room temperature for 1 hour, then dried in an oven at 110° C. for 4 hours in an air stream and subsequently allowed to stand in a desiccator overnight, thereby obtaining Catalyst 8 for use in producing acetic acid.

COMPARATIVE EXAMPLE 4

A silica support [KA-1, produced by Südchemie A. G., 5 mmo] (69 g) was impregnated with an aqueous solution (45 ml) of sodium tetrachloropalladate [$Na_2PdCl_4$] (3.80 g) to absorb the entire amount of the solution. Subsequently, the support was added to an aqueous solution (100 ml) of sodium metasilicate nonahydrate [$Na_2SiO_3.9H_2O$] (8.0 g) and allowed to stand at room temperature for 20 hours. To this solution, hydrazine monohydrate [$N_2H_4.H_2O$] (6.5 g) was added and after gently stirring it, the solution was allowed to stand at room temperature for 4 hours to cause reduction into metal palladium. Thereafter, the catalyst was collected by filtration, subjected to decantation, transferred to a glass column with a stop cock, washed by passing therethrough pure water for 40 hours, and then dried at 110° C. for 4 hours in an air stream to obtain a metal palladium supported catalyst.

The thus-obtained metal palladium supported catalyst 20 was impregnated with an aqueous solution (45 ml) containing silicotungstic acid hexacohydrate [$H_4SiW_{12}O_{40}.26H_2O$, produced by Japan Inorganic Colour & Chemical] (23.55 g) and ammonium metavanadate [$NH4VO3$, produced by Wako Junyaku] (0.0063 g). The addition was made by once operation and the mixture was slowly stirred and rotated until the solution was thoroughly absorbed (about 3 minutes). After the impregnation, the wet impregnated support was allowed to stand at room temperature for 1 hour, then dried in an oven at 110° C. for 4 hours in an air stream and subsequently allowed to stand in a desiccator overnight, thereby obtaining Catalyst 9 for use in producing acetic acid.

COMPARATIVE EXAMPLE 5

A silica support [KA-1, produced by Südchemie A. G., 5 mmφ] (69 g) was impregnated with an aqueous solution (45 ml) containing sodium tetrachloropalladate [$Na_2PdCl_4$] (3.80 g) and zinc chloride [$ZnCl_2$, produced by Wako Junyaku] (0.14 g) to absorb the entire amount of the solution. Subsequently, the support was added to an aqueous solution (100 ml) of sodium metasilicate nonahydrate [$Na_2SiO_3.9H_2O$] (10.5 g) and allowed to stand at room temperature for 20 hours. To this solution, hydrazine monohydrate [$N_2H_4.H_2O$] (6.5 g) was added and after gently stirring it, the solution was allowed to stand at room temperature for 4 hours to cause reduction into metal palladium. Thereafter, the catalyst was collected by filtration, subjected to decantation, transferred to a glass column with a stop cock, washed by passing therethrough pure water for 40 hours, and then dried at 110° C. for 4 hours in an air stream to obtain a metal palladium supported catalyst.

The thus-obtained metal palladium supported catalyst was impregnated with an aqueous solution (45 ml) of sodium tellurite [$Na_2TeO_3$] (0.27 g) to absorb the entire amount of the solution. Thereafter, the catalyst was dried at 110° C. for 4 hours in an air stream to obtain a metal palladium supported catalyst containing zinc and tellurium.

The thus-obtained metal palladium supported catalyst containing zinc and tellurium was impregnated with an aqueous solution (45 ml) of silicotungstic acid hexacohydrate [$H_4SiW_{12}O_{40}.26H_2O$] (23.55 g). The addition was made by once operation and the mixture was slowly stirred and rotated until the solution was thoroughly absorbed (about 3 minutes). After the impregnation, the wet impregnated support was allowed to stand at room temperature for 1 hour, then dried in an oven at 110° C. for 4 hours in an air stream and subsequently allowed to stand in a desiccator overnight, thereby obtaining Catalyst 10 for use in producing acetic acid.

Elemental Analysis of Catalysts for Use in Producing Acetic Acid

The elemental analysis of the catalyst components contained in the catalysts for use in producing acetic acid obtained in Examples 1 to 5 and Comparative Examples 1 to 5 was performed as follows. Each catalyst for use in producing acetic acid was dissolved in aqua regia and/or a mixed solution of hydrofluoric acid and aqua regia by heat-treating it under a pressure and respective components were completely extracted and measured by an inductively coupled plasma (ICP) emission spectrometer. The ICP emission spectrometer used was SPS-1700 manufactured by Seiko Instruments Inc.

The components in the catalysts for use in producing acetic acid obtained in Examples 1 to 5 and Comparative Examples 1 to 5 are shown together with the % by weight (wt %) in Table 1. In the table, "%" means "% by weight" based on each catalyst.

TABLE 1

| | Catalyst Name for use in production of acetic acid | Catalyst Component (a) | Catalyst Component Compound of Group (b) | Catalyst Component Element of Group (c) | Weight Ratio of (c) to (b) | Catalyst Component Element of Group (d) | Catalyst Component Element of Group (e) |
|---|---|---|---|---|---|---|---|
| Example 1 | Catalyst 1 | Pd 1.5% | silicotungstic acid 22% | V (vanadiun) 0.025% | 0.0012 | — | — |
| Example 2 | Catalyst 2 | Pd 1.5% | silicotungstic acid 22% | Mo (molybdenum) 0.025% | 0.0012 | — | — |
| Example 3 | Catalyst 3 | Pd 1.5% | silicotungstic acid 22% | V (vanadium) 0.028% | 0.0013 | Te (tellurium) 0.16% | — |
| Example 4 | Catalyst 4 | Pd 1.5% | silicotungstic acid 22% | V (vanadium) 0.025% | 0.0011 | Te (tellurium) 0.16% | Au (gold) 0.41% |
| Example 5 | Catalyst 5 | Pd 1.5% | silicotungstic acid 22% | V (vanadium) 0.025% | 0.0011 | Te (tellurium) 0.16% | Zn (zinc) 0.07% |
| Comparative Example 1 | Catalyst 6 | Pd 1.5% | silicotungstic acid 22% | — | 0 | — | — |
| Comparative Example 2 | Catalyst 7 | — | — | V (vanadium) 0.025% | — | — | — |
| Comparative Example 3 | Catalyst 8 | Pd 1.5% | — | V (vanadium) 0.025% | — | — | — |
| Comparative Example 4 | Catalyst 9 | Pd 1.5% | silicotungstic acid 22% | V (vanadium) 0.0017% | 0.00008 | — | — |
| Comparative Example 5 | Catalyst 10 | Pd 1.5% | silicotungstic acid 22% | — | 0 | Te (tellurium) 0.16% | Zn (zinc) 0.07% |

EXAMPLES 6 TO 10 AND COMPARATIVE EXAMPLES 6 TO 10

Catalysts for producing acetic acid obtained in Examples 1 to 5 and Comparative Examples 1 to 5 each (18.5 g) was filled in an SUS316 reaction tube (inner diameter: 25 mm) and an ethylene:oxygen:water:nitrogen mixed gas (10:6:15:69 by volume) was introduced thereinto at a space velocity of 1,800 hr$^{-1}$ under the conditions such that the reaction peak temperature of the catalyst layer was 200° C. and the reaction pressure was 0.8 MPa (gauge pressure), to perform a reaction for obtaining acetic acid from ethylene and oxygen. The gas produced was cooled, and the condensate after the cooling and the gas components were analyzed by gas chromatography [GC-14B, FID and TCD, manufactured by Shimadzu Kagaku K.K.].

The catalytic activity was calculated as the weight (space time yield STY, unit: g/hlcat) of acetic acid produced per hour per the catalyst volume (liter) and the selectivity was calculated as the percent of the product based on ethylene. The reaction results are shown in Table 2.

TABLE 2

| Example | Name of Catalyst for Use in Producing Acetic Acid | Space Time Yield STY of Acetic Acid (g/hlcat) | Selectivity Acetic Acid (%) | Selectivity Carbon Dioxide Gas (%) |
|---|---|---|---|---|
| Example 6 | Catalyst 1 | 110 | 69.0 | 27.0 |
| Example 7 | Catalyst 2 | 118 | 68.0 | 28.3 |
| Example 8 | Catalyst 3 | 163 | 87.4 | 6.3 |
| Example 9 | Catalyst 4 | 184 | 91.0 | 5.7 |
| Example 10 | Catalyst 5 | 180 | 90.3 | 6.3 |
| Comparative Example 6 | Catalyst 6 | 93 | 70.0 | 24.0 |
| Comparative Example 7 | Catalyst 7 | trace | trace | trace |
| Comparative Example 8 | Catalyst 8 | trace | 5.0 | 94.0 |
| Comparative Example 9 | Catalyst 9 | 92 | 71.2 | 25.3 |
| Comparative Example 10 | Catalyst 10 | 165 | 92.0 | 4.3 |

EXAMPLE 11

The catalyst for producing acetic acid obtained in Example 5 (15 g) was filled in an SUS316 reaction tube (inner diameter: 25 mm) and an ethylene:oxygen:water:nitrogen mixed gas (10:6:15:69 by volume) was introduced thereinto at a space velocity of 2,350 hr$^1$ under the conditions such that the reaction peak temperature of the catalyst layer was 170° C. and the reaction pressure was 0.8 MPa (gauge pressure), to perform a reaction for obtaining acetic acid from ethylene and oxygen. The gas produced was cooled, and the condensate after the cooling and the gas components were analyzed by gas chromatography [GC-14B, FID and TCD, manufactured by Shimadzu Kagaku K.K.].

The catalytic activity was calculated as the weight (space time yield STY, unit: g/hlcat) of acetic acid produced per hour per the catalyst volume (liter) and the change by aging was evaluated. The reaction results are shown in FIG. 1.

COMPARATIVE EXAMPLE 11

The reaction of Example 11 was repeated except for using the catalyst obtained in Comparative Example 5 (15 g) for use in producing acetic acid, and the change by aging was evaluated. The reaction results are shown in FIG. 1.

EXAMPLE 12

69 g of a silica support (made by Südchemie, KA-1, 5 mm diameter) was immersed in 45 ml of an aqueous solution of 3.80 g of sodium tetrachloropalladate (made by Tanaka Kikinzoku Kogyo, $Na_2PdCl_4$) to cause full absorption. Next, 90 ml of an aqueous solution of 8.0 g of sodium metasilicate 9-hydrate (made by Wako Pure Chemical Industry, $Na_2SiO_3.9H_2O$) was added and the result allowed to stand at room temperature for 20 hours. Next, 6.5 g of hydrazine 1-hydrate (made by Wako Pure Chemical Industry, $N_2H_4.H_2O$) was added to this and the result gently stirred, then this was allowed to stand at room temperature for 4 hours to reduce it to metal palladium. Next, the catalyst was filtered out and the result decanted, then transferred to a glass column equipped with a stopcock and washed by flushing with pure water for 40 hours. Next, the result was dried under a flow of air at 110° C. for 4 hours to obtain a metal palladium-supported catalyst.

Next, the above metal palladium-supported catalyst was impregnated with 45 ml of an aqueous solution of 23.55 g of silicotungstate 26-hydrate (made by Japan Inorganic Colour & Chemical, $H_4SiW_{12}O_{40}.26H_2O$) and 0.45 g of silicovanadotungstate 26-hydrate (made by Japan Inorganic Colour & Chemical, $H_5SiV_1W_{11}O_{40}.26H_2O$) The addition was performed once. The mixture was stirred and rotated gently until the solution was sufficiently absorbed (about 3 minutes). After impregnation, the support impregnated with moisture was allowed to stand at room temperature for 1 hour. Next, the result was dried in an oven in air at 110° C. for 4 hours, then was allowed to stand in a desiccator overnight. Due to this, Catalyst 12 used for producing acetic acid was obtained.

EXAMPLE 13

The same procedure was followed as in Example 12 to obtain Catalyst 13 used for producing acetic acid except that instead of the silicovanadotungstate 26-hydrate in Example 12, use was made of 0.25 g of phosphovanadomolybdate 26-hydrate (made by Japan Inorganic Colour & Chemical, $H_6PV_3Mo_9O_{40}.26H_2O$.

EXAMPLE 14

The same procedure was followed as in Example 12 to obtain Catalyst 14 used for producing acetic acid except that instead of the silicovanadotungstate 26-hydrate in Example 12, use was made of 0.25 g of phosphomolybdate 26-hydrate (made by Japan Inorganic Colour & Chemical, $H_4PMo_{12}O_{40}.26H_2O$.

EXAMPLE 15

69 g of a silica support (made by Sudchemie, KA-1, 5 mm diameter) was immersed in 45 ml of an aqueous solution of 3.8 g of sodium tetrachloropalladate (made by Tanaka Kikinzoku Kogyo, $Na_2PdCl_4$) to cause full absorption. Next, 45 ml of an aqueous solution of 8.0 g of sodium metasilicate 9-hydrate (made by Wako Pure Chemical Industry, $Na_2SiO_3.9H_2O$) was added and the result allowed to stand at room temperature for 20 hours. Next, 6.5 g of hydrazine 1-hydrate (made by Wako Pure Chemical Industry, $N_2H_4.H_2O$) was added to this and the result gently stirred, then this was allowed to stand at room temperature for 4 hours to reduce it to metal palladium. Next, the catalyst was filtered out and the result decanted, then transferred to a glass column equipped with a stopcock and washed by flushing with pure water for 40 hours. Next, the result was dried under a flow of air at 110° C. for 4 hours to obtain a metal palladium-supported catalyst.

Next, the above metal palladium-supported catalyst was impregnated with 45 ml of an aqueous solution of 23.55 g of silicotungstate 26-hydrate (made by Japan Inorganic Colour & Chemical, $H_4SiW_{12}O_{40}.26H_2O$), 0.27 g of telluric acid (made by Kanto Chemical, $H_6TeO_6$), and 0.45 g of silicovanadotungstate 26-hydrate (made by Japan Inorganic Colour & Chemical, $H_5SiV_1W_{11}O_{40}.26H_2O$). The addition was performed once. The mixture was stirred and rotated gently until the solution was sufficiently absorbed (about 3 minutes). After impregnation, the support impregnated with moisture was allowed to stand at room temperature for 1 hour. Next, the result was dried in an oven in air at 110° C. for 4 hours, then was allowed to stand in a desiccator overnight. Due to this, Catalyst 15 used for producing acetic acid was obtained.

EXAMPLE 16

The same procedure was followed as in Example 15 to obtain the catalyst 16 used for producing acetic acid except that instead of the telluric acid in Example 15, use was made of an acetic acid solution of 0.52 g of bismuth chloride (made by Wako Pure Chemical Industry, $BiCl_3.5H_2O$) to obtain the catalyst 16 for use in producing acetic acid.

EXAMPLE 17

69 g of a silica support (made by Sudchemie, KA-1, 5 mm diameter) was immersed in 45 ml of an aqueous solution of 3.80 g of sodium tetrachloropalladate and 0.78 g of tetrachloroaurate 4-hydrate (made by Tanaka Kikinzoku Kogyo, $H_4AuCl_4.4H_2O$) to cause full absorption. Next, this was added to a 100 ml of an aqueous solution of 8.0 g of sodium metasilicate 9-hydrate and the result allowed to stand at room temperature for 20 hours. Next, 6.5 g of hydrazine 1-hydrate was added to this and the result gently stirred, then this was allowed to stand at room temperature for 4 hours to reduce it to metal palladium. Next, the catalyst was filtered out and the result decanted, then transferred to a glass column equipped with a stopcock and washed by flushing with pure water for 40 hours. Next, the result was dried under a flow of air at 110° C. for 4 hours to obtain a metal palladium-supported catalyst containing gold.

Next, the above metal palladium-supported catalyst containing gold was impregnated with 45 ml of an aqueous solution of 23.55 g of silicotungstate 26-hydrate (made by Japan Inorganic Colour & Chemical, $H_4SiW_{12}O_{40}.26H_2O$) and 0.45 g of silicovanadotungstate 26-hydrate (made by Japan Inorganic Colour & Chemical, $H_5SiV_1W_{11}O_{40}.26H_2O$). The addition was performed once. The mixture was stirred and rotated gently until the solution was sufficiently absorbed (about 3 minutes). After impregnation, the support impregnated with moisture was allowed to stand at room temperature for 1 hour. Next, the result was dried in an oven in air at 110° C. for 4 hours, then was allowed to stand in a desiccator overnight. Due to this, Catalyst 17 used for producing acetic acid was obtained.

EXAMPLE 18

The same procedure was followed as in Example 17 to obtain Catalyst 18 used for producing acetic acid except that instead of the chloroaurate 4-hydrate in Example 17, use was made of 0.14 g of zinc chloride (made by Wako Pure Chemical Industry, $ZnCl_2$).

EXAMPLE 19

69 g of a silica support (made by Sudchemie, KA-1, 5 mm diameter) was immersed in 45 ml of an aqueous solution of 3.80 g of sodium tetrachloropalladate and 0.14 g of zinc chloride (made by Wako Pure Chemical Industry, $ZnCl_2$) to cause full absorption. Next, this was added to a 100 ml of an aqueous solution of 8.0 g of sodium metasilicate 9-hydrate and the result allowed to stand at room temperature for 20 hours. Next, 6.5 g of hydrazine 1-hydrate was added to this and the result gently stirred, then this was allowed to stand at room temperature for 4 hours to reduce it to metal palladium. Next, the catalyst was filtered out and the result decanted, then transferred to a glass column equipped with a stopcock and washed by flushing with pure water for 40 hours. Next, the result was dried under a flow of air at 110° C. for 4 hours to obtain a metal palladium-supported catalyst containing zinc.

Next, the above metal palladium-supported catalyst containing zinc was impregnated with 45 ml of an aqueous solution of 23.55 g of silicotungstate 26-hydrate (made by Japan Inorganic Colour & Chemical, $H_4SiW_{12}O_{40} \cdot 26H_2O$), 0.27 g of telluric acid (made by Kanto Chemical, $H_6TeO_6$), and 0.45 g of silicovanadotungstate 26-hydrate (made by Japan Inorganic Colour & Chemical, $H_5SiV_1W_{11}O_{40} \cdot 26H_2O$). The addition was performed once. The mixture was stirred and rotated gently until the solution was sufficiently absorbed (about 3 minutes). After impregnation, the support impregnated with moisture was allowed to stand at room temperature for 1 hour. Next, the result was dried in an oven in air at 110° C. for 4 hours, then was allowed to stand in a desiccator overnight. Due to this, Catalyst 19 used for producing acetic acid was obtained.

EXAMPLE 20

The same procedure was followed as in Example 19 to obtain Catalyst 20 used for producing acetic acid except that instead of the silicovanadotungstate 26-hydrate in Example 19, use was made of 0.25 g of phosphovanadomolybdate 26-hydrate (made by Japan Inorganic Colour & Chemical, $H_6PV_3Mo_9O_{40} \cdot 26H_2O$).

COMPARATIVE EXAMPLE 12

Catalyst for Use in Producing Acetic Acid Comprised, by Weight Ratio, of Compound of Group (b):At Least One Compound Selected From. Heteropolyacids of Group (c) and Their Salts 1:0]

The same procedure was followed as in Example 12 to obtain Catalyst 21 used for producing acetic acid except that instead of the 23.55 g of silicotungstate 26-hydrate (made by Japan Inorganic Colour & Chemical, $H_4SiW_{12}O_{40} \cdot 26H_2O$) and the 0.45 g of silicovanadotungstate 26-hydrate (made by Japan Inorganic Colour & Chemical, $H_5SiV_1W_{11}O_{40} \cdot 26H_2O$) in Example 12, use was made of 24 g of silicotungstate 26-hydrate (made by Japan Inorganic Colour & Chemical, $H_4SiW_{12}O_{40} \cdot 26H_2O$).

COMPARATIVE EXAMPLE 13

Catalyst for Use in Producing Acetic Acid Comprised, by Weight Ratio, of Compound of Group (b):At Least One Compound Selected From Heteropolyacids of Group (c) and Their Salts=0:1

The same procedure was followed as in Example 12 to obtain Catalyst 22 used for producing acetic acid except that instead of the 23.55 g of silicotungstate 26-hydrate (made by Japan Inorganic Colour & Chemical, $H_4SiW_{12}O_{40} \cdot 26H_2O$) and the 0.45 g of silicovanadotungstate 26-hydrate (made by Japan Inorganic Colour & Chemical, $H_5SiV_1W_{11}O_{40} \cdot 26H_2O$) in Example 12, use was made of 24 g of silicovanadotungstate 26-hydrate (made by Japan Inorganic Colour & Chemical, $H_4SiV_1W_{11}O_{40} \cdot 26H_2O$).

COMPARATIVE EXAMPLE 14

Catalyst for Use in Producing Acetic Acid Comprised, by Weight Ratio, of Compound of Group (b):At Least One Compound Selected From Heteropolyacids of Group (c) and Their Salts=At Least 1:0.2

The same procedure was followed as in Example 12 to obtain Catalyst 23 used for producing acetic acid except that instead of the 23.55 g of silicotungstate 26-hydrate (made by Japan Inorganic Colour & Chemical, $H_4SiW_{12}O_{40} \cdot 26H_2O$) and the 0.45 g of silicovanadotungstate 26 hydrate (made by Japan Inorganic Colour & Chemical, $H_5SiV_1W_{11}O_{40} \cdot 26H_2O$) in Example 12, use was made of 23.55 g of silicotungstate 26-hydrate (made by Japan Inorganic Colour & Chemical, $H_4SiW_{12}O_{40} \cdot 26H_2O$) and 10.0 g of phosphovanadomolybdate 30-hydrate (made by Japan Inorganic Colour & Chemical, $H_4PV_1Mo_{11}O_{40} \cdot 30H_2O$)

COMPARATIVE EXAMPLE 15

Catalyst for use in Producing Acetic Acid Comprised, by Weight Ratio, of Compound of Group (b):At Least One Compound Selected From Heteropolyacids of Group (c) and Their Salts=Less Than 1:0.005

The same procedure was followed as in Example 12 to obtain Catalyst 24 used for producing acetic acid except that instead of the 23.55 g of silicotungstate 26-hydrate (made by Japan Inorganic Colour & Chemical, $H_4SiW_{12}O_{40} \cdot 26H_2O$) and the 0.45 g of silicovanadotungstate 26-hydrate (made by Japan Inorganic Colour & Chemical, $H_5SiV_1W_{11}O_{40} \cdot 26H_2O$) in Example 12, use was made of 23.95 g of silicotungstate 26-hydrate (made by Japan Inorganic Colour & Chemical, $H_4SiW_{12}O_{40} \cdot 26H_2O$) and 0.05 g of silicovanadotungstate 26-hydrate (made by Japan Inorganic Colour & Chemical, $H_5SiV_1W_{11}O_{40} \cdot 26H_2O$)

COMPARATIVE EXAMPLE 16

Catalyst for Use in Producing Acetic Acid Comprised, by Weight Ratio, of Compound of Group (b):At Least One Compound Selected From Heteropolyacids of Group (c) and Their Salts 1:0

The same procedure was followed as in Example 19 to obtain Catalyst 25 used for producing acetic acid except that instead of the 23.55 g of silicotungstate 26-hydrate (made by Japan Inorganic Colour & Chemical, $H_4SiW_{12}O_{40} \cdot 26H_2O$), 0.27 g of telluric acid (made by Kanto Chemical, $H_6TeO_6$), and the 0.45 g of silicovanadotungstate 26-hydrate (made by Japan Inorganic Colour & Chemical, $H_5SiV_1W_{11}O_{40} \cdot 26H_2O$) in Example 19, use was made of 24 g of silicotungstate 26-hydrate (made by Japan Inorganic Colour & Chemical, $H_4SiW_{12}O_{40} \cdot 26H_2O$)) and 0.27 g of telluric acid (made by Kanto Chemical, $H_6TeO_6$).

Elementary Analysis of Catalysts for Use for Producing Acetic Acid

The elementary analysis of the metal elements and the heteropolyacids contained in the catalyst for use in producing an acetic acid obtained in Examples 12 to 20 and Comparative Examples 12 to 16 was conducted as follows. The catalysts for use in producing acetic acids were dissolved by heat treatment under pressure in the presence of aqua regia and/or a mixture of hydrofluoric acid and aqua regia. The components were completely extracted and measured by an inductively coupled plasma (ICP) emission spectrophotometry. As the ICP spectrophotometric apparatus, use was made of an SPS-1700 made by Seiko Instruments.

Table 3 shows the wt % of the components for Catalysts 12 to 25 for use in producing acetic acid obtained in Examples 12 to 20 and Comparative Examples 12 to 16. Note that the % in the table shows the wt % with respect to the catalysts. Further, the wt % of the heteropolyacids of the group (b) and the heteropolyacids containing the elements of group (c) were calculated as anhydrides.

TABLE 3

| | Catalyst Name | Catalyst Component (a) | Catalyst Component Compound of Group (b) | Catalyst Component Heteropolyacid of Group (c) and its salt | Ratio by weight Compound of Group (b): Element of Group (c) | Catalyst Component Element of Group (d) | Catalyst Component Element of Group (a) |
|---|---|---|---|---|---|---|---|
| Example 12 | Catalyst 12 | Pd 1.46% | silicotungstic acid, 21.7% | silicovanadomolybdic acid, 0.48% | 1:0.00035 | — | — |
| Example 13 | Catalyst 13 | Pd 1.46% | silicotungstic acid, 21.7% | phosphovanadomolybdic acid, 0.26% | 1:0.0057 | — | — |
| Example 14 | Catalyst 14 | Pd 1.46% | silicotungstic acid, 21.7% | phosphomolybdic acid, 0.26% | 1:00613 | — | — |
| Example 15 | Catalyst 15 | Pd 1.46% | silicotungstic acid, 21.7% | silicovanadomolybdic acid, 0.48% | 1:00035 | Te (tellurium) 0.16% | — |
| Example 16 | Catalyst 16 | Pd 1.46% | silicotungstic acid, 21.7% | silicovanadomolybdic acid, 0.48% | 1:00035 | Bi (bismuth) 0.37% | — |
| Example 17 | Catalyst 17 | Pd 1.46% | silicotungstic acid, 21.7% | silicovanadomolybdic acid, 0.48% | 1:00035 | — | Au (gold) 0.40% |
| Example 18 | Catalyst 18 | Pd 1.46% | silicotungstic acid, 21.7% | silicovanadomolybdic acid, 0.48% | 1:00035 | — | Zn (zinc) 0.07% |
| Example 19 | Catalyst 19 | Pd 1.46% | silicotungstic acid, 21.7% | silicovanadomolybdic acid, 0.48% | 1:00035 | Te (tellurium) 0.16% | Zn (zinc) 0.07% |
| Example 20 | Catalyst 20 | Pd 1.46% | silicotungstic acid, 21.7% | phosphovanadomolybdic acid, 0.26% | 1:0.0057 | Te (tellurium) 0.16% | Zn (zinc) 0.07% |
| Comparative Example 12 | Catalyst 21 | Pd 1.46% | silicotungstic acid, 21.7% | — | 1:0 | — | — |
| Comparative Example 13 | Catalyst 22 | Pd 1.46% | silicovanadotungstic acid, 22.0% | — | 0:1 | — | — |
| Comparative Example 14 | Catalyst 23 | Pd 1.46% | silicotungstic acid, 20.1% | phosphovanadomolybdic acid, 1.33% | 1:0.232 | — | — |
| Comparative Example 15 | Catalyst 24 | Pd 1.46% | silicotungstic acid, 21.2% | silicovanadotungstic acid, 0.045% | 1:0.00080 | — | — |
| Comparative Example 16 | Catalyst 25 | Pd 1.46% | silicotungstic acid, 21.7% | — | 1:0 | Te (tellurium) 0.16% | Zn (zinc) 0.07% |

EXAMPLES 21 TO 29 AND COMPARATIVE EXAMPLES 17 TO 20

18.5 g of each of Catalysts 12 to 25 for use in producing acetic acids obtained in Examples 12 to 20 and Comparative Examples 12 to 16 was packed in an SUS316 reaction tube (inner diameter 25 mm). A gas obtained by mixing ethylene, oxygen, water, and nitrogen in a ratio of 10:6:20:64 was introduced at a space velocity of 1800 hr−1 at a reaction peak temperature of the catalytic layer of 200° C. and a reaction pressure of 0.8 MPa (gauge pressure) to cause a reaction obtaining acetic acid from the ethylene and oxygen. The generated gas was cooled and the cooled condensate and gas components were analyzed by gas chromatography (Shimadzu Science, GC-14B, FID, and TCD).

The activity of each catalyst was calculated as the weight of the acetic acid produced per volume of catalyst (liter) per hour (space-time yield STY/unit g/hlcat). The selectivity was calculated as a percent of the product with respect to the ethylene.

The results of the reaction are shown in Table 4.

TABLE 4

| | | Space yield | Selectivity | |
|---|---|---|---|---|
| Examples | Name of catalyst | of acetic acid (g/hlcat) | Acetic acid (%) | Carbonic acid gas (%) |
| Example 21 | Catalyst 12 | 115 | 71.6 | 24.0 |
| Example 22 | Catalyst 13 | 113 | 72.3 | 23.0 |
| Example 23 | Catalyst 14 | 100 | 75.6 | 20.0 |
| Example 24 | Catalyst 15 | 173 | 92.2 | 5.6 |
| Example 25 | Catalyst 16 | 170 | 89.2 | 8.0 |
| Example 26 | Catalyst 17 | 165 | 82.0 | 11.3 |
| Example 27 | Catalyst 18 | 170 | 83.0 | 13.0 |
| Example 28 | Catalyst 19 | 188 | 88.4 | 5.6 |
| Example 29 | Catalyst 20 | 183 | 87.0 | 6.1 |
| Comparative Example 17 | Catalyst 21 | 93 | 70.0 | 24.0 |
| Comparative Example 18 | Catalyst 22 | 83 | 68.0 | 28.3 |
| Comparative Example 19 | Catalyst 23 | 93 | 69.8 | 24.3 |
| Comparative Example 20 | Catalyst 24 | 85 | 69.0 | 27.3 |

EXAMPLE 30 AND COMPARATIVE EXAMPLE 21

Each of Catalyst 19 for use in producing acetic acid obtained in Example 19 and Catalyst 25 for use in producing acetic acids Comparative Example 16 was packed in an SUS316 reaction tube (inner diameter 25 mm). A gas obtained by mixing ethylene, oxygen, water, and nitrogen in a ratio of 10:6:25:59 was introduced at a space velocity of 1800 hr−1 at a shell temperature of 180° C. and a reaction pressure of 0.8 MPa (gauge pressure) to cause a reaction obtaining acetic acid from the ethylene and oxygen, The generated gas was cooled and the cooled condensate and gas components were analyzed by gas chromatography (Shimadzu Science, GC-14B, FID, and TCD).

The activity of each catalyst was calculated as the weight of the acetic acid produced per volume of catalyst (liter) per hour (spacetime yield STY/unit g/hlcat). The selectivity was calculated as a percent of the product with respect to the ethylene.

The change by aging of the STY of the acetic acid is shown in FIG. 2 as the result of the reaction.

EXAMPLE 31

69 g of a silica support (made by Sudchemie, KA-1, 5 mm diameter) was immersed in 45 ml of an aqueous solution of 2.76 g of sodium tetrachloropalladate, 0.14 g of zinc chloride (made by Wako Pure Chemical Industry, $ZnCl_2$), and 0.78 g of tetrachloroaurate 4-hydrate (made by Tanaka Kikinzoku Kogyo, $H_4AuCl_4.4H_2O$) to cause full absorption. Next, this was added to 100 ml of an aqueous solution of 8.2 g of sodium metasilicate 9-hydrate and the result allowed to stand at room temperature for 20 hours. Next, 5.75 g of hydrazine 1-hydrate was added to this and the result gently stirred, then this was allowed to stand at room temperature for 4 hours to reduce it to metal palladium. Next, the catalyst was filtered out and the result decanted, then transferred to a glass column equipped with a stopcock and washed by flushing with pure water for 40 hours. Next, the result was dried under a flow of air at 110° C. for 4 hours to obtain a metal palladium-supported catalyst containing zinc and gold.

Next, the above metal palladium-supported catalyst containing zinc and gold was impregnated with 45 ml of an aqueous solution of 0.266 g of sodium tellurite (made by Wako Pure Chemical Industry, $Na_2TeO_3$). The result was air dried for 1 hour, then transferred to a glass column equipped with a stopcock and washed by flushing with pure water for 16 hours. The result was dried under a flow of air at 110° C. for 4 hours to obtain a metal palladium-supported catalyst containing zinc, gold, and tellurium.

Next, the above metal palladium-supported catalyst containing zinc, gold, and tellurium was impregnated with 45 ml of an aqueous solution of 23.43 g of silicotungstate 26-hydrate (made by Japan Inorganic Colour & Chemical, $H_4SiW_{12}O_{40}.26H_2O$), 0.326 g of phosphovanadomolybdate 30-hydrate (made by Japan Inorganic Colour & Chemical, $H_4V_1Mo_{11}O_{40}.30H_2O$), and 0.206 g of manganese nitrate 6-hydrate (Wako Pure Chemical Industry, $Mn(No_3)_2.6H_2O$).

The addition was performed once. The mixture was stirred and rotated gently until the solution was sufficiently absorbed (about 3 minutes). After impregnation, the support impregnated with moisture was allowed to stand at room temperature for 1 hour. Next, the result was dried in an oven in air at 110° C. for 4 hours, then was allowed to stand in a desiccator overnight. Due to this, Catalyst 26 used for producing acetic acid was obtained.

EXAMPLE 32

The same procedure was followed as in Example 31 to obtain Catalyst 27 used for producing acetic acid except that instead of the manganese nitrate 6-hydrate in Example 31, use was made of 0.214 g of cobalt nitrate 6-hydrate (made by Wako Pure Chemical Industry, $Co(NO_3)_2.6H_2O$).

EXAMPLE 33

The same procedure was followed as in Example 31 to obtain catalyst 28 used for producing acetic acid except that instead of the zinc chloride in Example 31, use was made of 0.283 g of chromium chloride 6-hydrate (made by Wako Pure Chemical Industry, $CrCl_3.6H_2O$).

Elementary Analysis of Catalysts for Use in Producing Acetic Acid

The elementary analysis of the metal elements and the heteropolyacids contained in the catalysts for use in producing an acetic acid obtained in Examples 31 to 33 was conducted as follows. The catalysts for use in producing acetic acids were dissolved by heat treatment under pressure in the presence of aqua regia and/or a mixture of fluoric acid and aqua regia. The components were completely extracted and measured by inductively coupled plasma (ICP) emission spectrophotometry, As the ICP spectrophotometric apparatus, use was made of an SPS-1700 made by Seiko Instruments.

Table 5 shows the wt % of the components for Catalysts 26 to 28 for use in producing acetic acid obtained in Examples 31 to 33. Note that the % in the table shows the wt % with respect to the catalysts. Further the wt % of the heteropolyacids of the group (b) and the heteropolyacids containing the elements of group (c) were calculated as anhydrides.

TABLE 5

| | Catalyst Name | Catalyst Component (a) | Catalyst Component Compound of Group (b) | Catalyst Component Heteropolyacid of Group (c) and its salt | Ratio by weight Compound of Group (b): Element of Group (c) | Catalyst Component Element of Group (d) | Catalyst Component Element of Group (e) | Catalyst Component Element of Group (f) |
|---|---|---|---|---|---|---|---|---|
| Example 31 | Catalyst 26 | Pd 1.08% | manganese silicotungstate 22.9% | phosphovanadomolybdic acid, 0.27% | 1:0.0076 | Te (tellurium) 0.11% | Zn (zinc) 0.07% | Au (gold) 0.41% |
| Example 32 | Catalyst 27 | Pd 1.08% | cobalt silicotungstate, 22.9% | phosphovanadomolybdic acid, 0.27% | 1:0.0076 | Te (tellurium) 0.11% | Zn (zinc) 0.07% | Au (gold) 0.41% |
| Example 33 | Catalyst 28 | Pd 1.08% | manganese silicotungstate, 22.9% | phosphovanadomolybdic acid, 0.26% | 1:0.0076 | Te (tellurium) 0.11% | Cr (chromium) 0.07% | Au (gold) 0.41% |

EXAMPLES 34 TO 36

18.5 g of each of the catalysts for use in producing acetic acids obtained in Examples 31 to 33 was packed in an SUS316 reaction tube (inside diameter 25 mm). A gas obtained by mixing ethylene, oxygen, water, and nitrogen in a ratio of 10:6:15:69 was introduced at a space velocity of 1800 hr−1 at a reaction peak temperature of the catalytic layer of 205° C. and a reaction pressure of 0.8 MPa (gauge pressure) to cause a reaction obtaining acetic acid from the ethylene and oxygen. The generated gas was cooled and the cooled condensate and gas components were analyzed by gas chromatography (Shimadzu Science, GC-14B, FID, and TCD).

The activity of each catalyst was calculated as the weight of the acetic acid produced per volume of catalyst (liter) per hour (space-time yield STY/unit g/hlcat). The selectivity was calculated as a percent of the product with respect to the ethylene.

The reaction results are shown in Table 6.

TABLE 6

| Examples | Name of catalyst | Space yield of acetic acid (g/hlcat) | Selectivity | |
|---|---|---|---|---|
| | | | Acetic acid (%) | Carbonic acid gas (%) |
| Example 34 | Catalyst 26 | 189 | 92.0 | 6.5 |
| Example 35 | Catalyst 27 | 192 | 90.7 | 7.5 |
| Example 36 | Catalyst 28 | 187 | 88.0 | 9.8 |

INDUSTRIAL APPLICABILITY

As described in the foregoing pages, by reacting ethylene and oxygen using the catalyst for use in producing acetic acid according to the present invention, the production of acetic acid with high space time yield of acetic acid and reduced change by aging, in turn high productivity can be achieved in the production of acetic acid as compared with conventional processes.

What is claimed is:

1. A catalyst for use in producing acetic acid by reacting ethylene and oxygen, wherein said catalyst is a catalyst comprised of:
   (a) palladium,
   (b) at least one compound selected from the group comprised of heteropolyacids and their salts, wherein the poly-atom in the heteropolyacid does not include vanadium and/or molybdenum, and
   (c) a component containing a vanadium element and/or molybdenum element supported on a support, and the weight ratio (b): (c)=1:0.0001 to 0.2.

2. A catalyst for use in producing acetic acid by reacting ethylene and oxygen, wherein said catalyst is comprised of:
   (a) palladium,
   (b) at least one compound selected from the group consisting of heteropolyacids and their salts, wherein the poly-atom in the heteropolyacid does not include vanadium and/or molybdenum,
   (c) a component containing a vanadium element and/or molybdenum element, and
   (d) at least one element selected from the consisting of the elements belonging to Group 14, 15, and Group 16 of the Periodic Table,
supported on a support, and the weight of (b): (c)=1:0.0001 to 0.2.

3. A catalyst for use in producing acetic acid which is used in the process of producing acetic acid by reacting ethylene and oxygen, wherein said catalyst is a catalyst comprised of:
   (a) palladium,
   (b) at least one compound selected from the group consisting of heteropolyacids and their salts, wherein the poly-atom in the heteropolyacid does not include vanadium and/or molybdenum,
   (c) a component containing a vanadium element and/or molybdenum element,
   (d) at least one element selected from the group consisting of the elements belonging to Group 14, Group 15, and Group 16 of the Periodic Table, and
   (e) at least one element selected from the group consisting of the elements belonging to Group 7, Group 8, Group 9, Group 10, Group 11, and Group 12 of the Periodic Table
supported on a support, and the weight ratio (b): (c)=1:0.0001 to 0.2.

4. A catalyst for use in producing acetic acid according to any one of claims 1 to 3, wherein component (c) is at least one compound selected from vanadium element- and/or molybdenum element-containing heteropolyacids and their salts and the weight ratio (c)=1:0.005 to 0.2.

5. A catalyst for use in producing acetic acid according to any one of claims 1 to 3, wherein (b) is at least one compound selected from the group consisting of the following heteropolyacids and their salts:
   1–12-phosphotungstic acid: $H_3[PW_{12}O_{40}] \cdot xH_2O$
   1–12-silicotungstic acid: $H_4[SiW_{12}O_{40}] \cdot xH_2O$
wherein x is an integer of at least 1.

6. A catalyst for use in producing acetic acid according to any one of claims 1 to 3 wherein (c) is at least one compound selected from the group consisting of the following heteropolyacids and their salts:
   phosphomolybdic acid: $H_3[PMo_{12}O_{40}] \cdot xH_2O$
   silicomolybdic acid: $H_4[SiMo_{12}O_{40}] \cdot xH_2O$
   silicovanadotungstic acid: $H_{4+n}[SiV_nW_{12-n}O_{40}] \cdot xH_2O$
   phosphovanadotungstic acid: $H_{3+n}[PV_nW_{12-n}O_{40}] \cdot xH_2O$
   silicovanadomolybdic acid: $H_{4+n}[SiV_nMo_{12-n}O_{40}] \cdot xH_2O$
   phosphovanadomolybdic: $H_{3+n}[PV_nMo_{12-n}O_{40}] \cdot xH_2O$
   silicomolybdotungstic acid: $H_{4+n}[SiMo_nW_{12-n}O_{40}] \cdot xH_2O$
   phosphomolybdotungstic acid: $H_{3+n}[PMoW_{12-n}O_{40}] \cdot xH_2O$
wherein n is an integer of 1 to 11, and x is an integer of at least 1.

7. A catalyst for use in producing acetic acid according to any one of claims 1 to 3, wherein (a) is metal palladium.

8. A catalyst for use in producing acetic acid according to any one of claims 2 or 3, wherein (d) is at least one element selected from the group consisting of tellurium, selenium, bismuth, and lead.

9. A catalyst for use in producing acetic acid according to claim 3, wherein (e) is at least one element selected from the group consisting of copper, gold, and zinc.

10. A process for producing the catalyst for use in producing acetic acid as set forth in claim 1, comprising the following first and second steps:
   First Step
      a step for loading (a) palladium on a support to obtain a palladium-supported catalyst and
   Second Step
      a step for loading (b) at least one compound selected from heteropolyacids and salts thereof, wherein the poly-atom in the heteropolyacid does not include vanadium and/or molybdenum and (c) a component containing a vanadium element and/or molybdenum element on the palladium-supported catalyst obtained in the first step to obtain a catalyst for use in producing acetic acid.

11. A process for producing the catalyst for use in producing acetic acid as set forth in claim 2, comprising the following first and second steps;

First Step
 a step for loading (a) palladium and (d) at least one element selected from the group consisting of the elements belonging to Group 14, Group 15, and Group 16 of the Periodic Table on a support to obtain a palladium-supported catalyst and Second Step
 a step for loading (b) at least one compound selected from heteropolyacids and salts thereof, wherein the poly-atom in the heteropolyacid does not include vanadium and/or molybdenum and (c) a component containing a vanadium element and/or molybdenum element on the palladium-supported catalyst obtained in the first step to obtain a catalyst for use in producing acetic acid.

12. A process for producing the catalyst for use in producing acetic acid as set forth in claim 2, comprising the following first and second steps:

First step
 a step for loading (a) palladium on a support to obtain a palladium-supported catalyst and Second Step
 a step for loading (b) at least one compound selected from heteropolyacids and salts thereof, wherein the poly-atom in the heteropolyacid does not include vanadium and/or molybdenum (c) a component containing a vanadium and/or molybdenum element, and (d) at least one element selected from the group consisting of the elements belonging to Group 14, Group 15, and Group 16 of the Periodic Table On the palladium-supported catalyst obtained in the first step to obtain a catalyst for use in producing acetic acid.

13. A process for producing the catalyst for use in producing acetic acid as set forth in claim 3, comprising the following first and second steps:

First step
 a step for loading (a) palladium and (d) at least one element selected from the group consisting of the elements belonging to Group 14, Group 15, and Group 16 of the Periodic Table on a support to obtain a palladium-supported catalyst and Second Step
 a step for loading (b) at least one compound selected from heteropolyacids and salts thereof, wherein the poly-atom in the heteropolyacid does not include vanadium and/or molybdenum, (c) a component containing a vanadium element and/or molybdenum element, and (e) at least one element selected from the group consisting of the elements belonging to Group 7, Group 8, Group 9, Group 10, Group 11, and Group 12 of the Periodic Table on the palladium-supported catalyst obtained in the first step to obtain a catalyst for use in producing acetic acid.

14. A process for producing the catalyst for use in producing acetic acid as set forth in claim 3, comprising the following first and second steps:

First Step
 a step for loading palladium and (e) at least one element selected from the group consisting of the elements belonging to Group 7, Group 8, Group 9, Group 10, Group 11 and Group 12 of the Periodic Table on a support to obtain a palladium-supported catalyst and Second Step
 a step for loading (b) at least one compound selected from heteropolyacids and salts thereof, wherein the poly-atom in the heteropolyacid does not include vanadium and/or molybdenum, (c) a component containing a vanadium element and/or molybdenum element, and (d) at least one element selected from the group consisting of the elements belonging to Group 14, Group 15, and Group 16 of the periodic Table on the palladium-supported catalyst obtained in the first step to obtain a catalyst for use in producing acetic acid.

15. A process for producing the catalyst for use in producing acetic acid as set forth in claim 3, comprising the following first and second steps:

First Step
 a step for loading (a) palladium, (d) at least one element selected from the group consisting of the elements belonging to Group 14, Group 15, and Group 16 of the Periodic Table, and (e) at least one element selected from the group consisting of the elements belonging to Group 7, Group 8, Group 9, Group 10, Group 11, and Group 12 of the Periodic Table on a support to obtain a palladium-supported catalyst and Second Step
 a step for loading (b) at least one compound selected from heteropolyacids and salts thereof, wherein the poly-atom in the heteropolyacid does not include vanadium and/or molybdenum, and (c) a component containing a vanadium element and/or molybdenum element on the palladium-supported catalyst obtained in the first step to obtain a catalyst for use in producing acetic acid.

16. A process for producing the catalyst for use in producing acetic acid as set forth in claim 3, comprising the following first and second steps:

First Step
 a step for loading (a) palladium on a support to obtain a palladium-supported catalyst and Second Step
 a step for loading (b) at least one compound selected from heteropolyacids and salts thereof, wherein the poly-atom in the heteropolyacid does not include vanadium and/or molybdenum, (c) a component containing a vanadium element and/or molybdenum element, (d) at least one element selected from the group consisting of the elements belonging to Group 14, Group 15, and Group 16 of the Periodic Table, and (e) at least one element selected from the group consisting of the elements belonging to Group 7, Group 8, Group 9, Group 10, Group 11, and Group 12 of the Periodic Table on the palladium-supported catalyst obtained in the first step to obtain a catalyst for use in producing acetic acid.

17. A process for producing acetic acid comprising reacting ethylene and oxygen in the presence of a catalyst for use in producing acetic acid as set forth in claim 3.

18. A process for producing acetic acid as described in claim 17, wherein ethylene and oxygen are reacted in the presence of water.

19. A process for producing acetic acid as described in claim 18, wherein the concentration of water is 1 to 40 vol %.

* * * * *